United States Patent
Kleo et al.

(10) Patent No.: US 8,829,539 B2
(45) Date of Patent: Sep. 9, 2014

(54) LUMINOUS VEHICLE GLAZING AND MANUFACTURE THEREOF

(75) Inventors: Christophe Kleo, Attichy (FR); Bastien Grandgirard, Marqueglise (FR); Alexandre Richard, Paris (FR); Adele Verrat-Debailleul, Villers Sur Coudun (FR)

(73) Assignee: Saint-Gobain Glass France, Courbevoie (FR)

( * ) Notice: Subject to any disclaimer, the term of this patent is extended or adjusted under 35 U.S.C. 154(b) by 239 days.

(21) Appl. No.: 13/575,406

(22) PCT Filed: Jan. 24, 2011

(86) PCT No.: PCT/FR2011/050125
§ 371 (c)(1),
(2), (4) Date: Sep. 6, 2012

(87) PCT Pub. No.: WO2011/092419
PCT Pub. Date: Aug. 4, 2011

(65) Prior Publication Data
US 2012/0320621 A1    Dec. 20, 2012

(30) Foreign Application Priority Data
Jan. 26, 2010 (FR) ..................... 10 50521

(51) Int. Cl.
*H01L 27/15* (2006.01)
*H01L 21/00* (2006.01)

(52) U.S. Cl.
USPC .............................. 257/82; 438/31

(58) Field of Classification Search
USPC ............... 438/23–31, 46, 47; 257/80–98
See application file for complete search history.

(56) References Cited

U.S. PATENT DOCUMENTS 4,960,631 A * 10/1990 Walters et al. ............... 428/192
6,131,563 A * 10/2000 Bonnetin et al. ........... 126/373.1
6,305,109 B1   10/2001 Lee
(Continued)

FOREIGN PATENT DOCUMENTS

| | | |
|---|---|---|
| EP | 1 154 199 | 11/2001 |
| FR | 2 895 781 | 7/2007 |
| WO | 2006 137660 | 12/2006 |
| WO | 2008 090646 | 7/2008 |

OTHER PUBLICATIONS

U.S. Appl. No. 13/575,407, filed Jul. 26, 2012, Kleo, et al.
(Continued)

*Primary Examiner* — Calvin Lee
(74) *Attorney, Agent, or Firm* — Oblon, Spivak, McClelland, Maier & Neustadt, L.L.P.

(57) ABSTRACT

A luminous vehicle glazing, containing: a first sheet containing a mineral or an organic glass having a first main face, a second main face, and an injection edge; a peripheral light source with an emitting face, which faces the injection edge; a guided-light extracting element; a peripheral functional element, bonded to the first sheet, which is fluid-tight, including a cavity for placing the peripheral light source; a covering element, which covers the cavity and the peripheral light source, which is fluid-tight, and which is selected from i) a cap combined with an interfacial element, for interfacial fluid-tightness or ii) a fluid-tight sealing mastic covering the peripheral light source and sealing the peripheral functional element. In addition, a method of manufacturing the luminous vehicle glazing.

23 Claims, 17 Drawing Sheets

(56) References Cited

U.S. PATENT DOCUMENTS

2002/0007576 A1  1/2002  Gai
2009/0174300 A1  7/2009  Jousse et al.
2010/0073959 A1  3/2010  Hamada

OTHER PUBLICATIONS

International Search Report Issued Apr. 8, 2011 in PCT/FR11/50125 Filed Jan. 24, 2011.

* cited by examiner

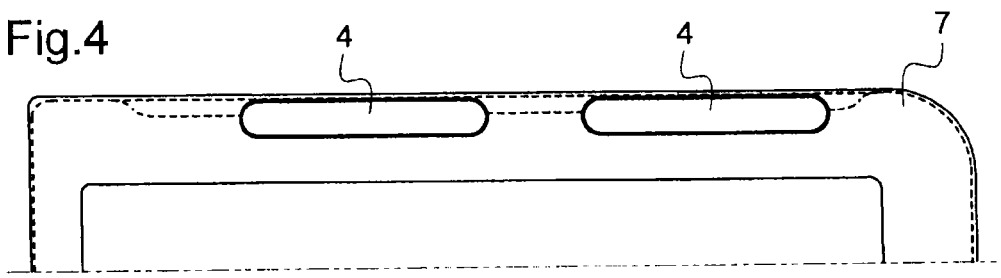
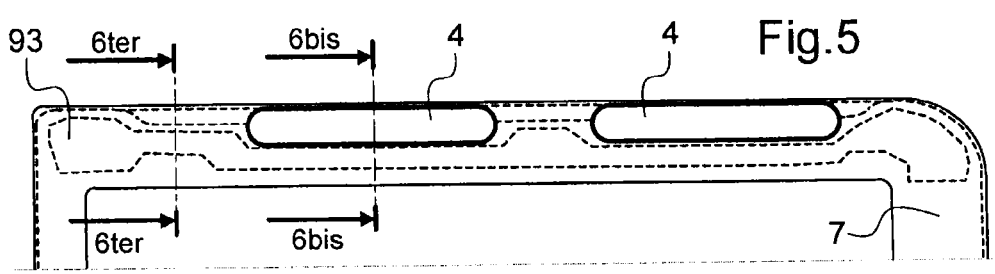
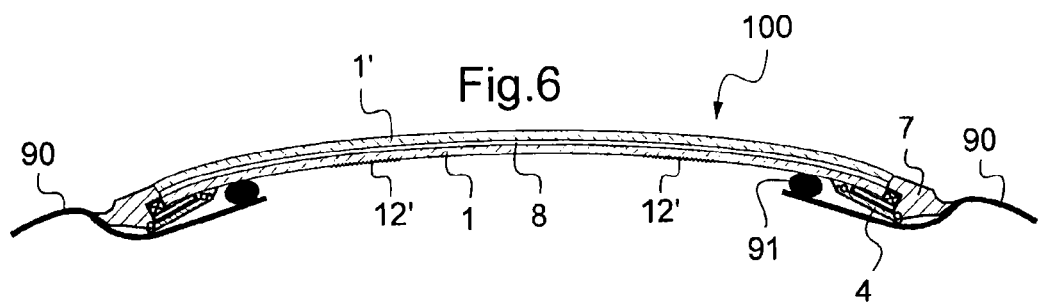
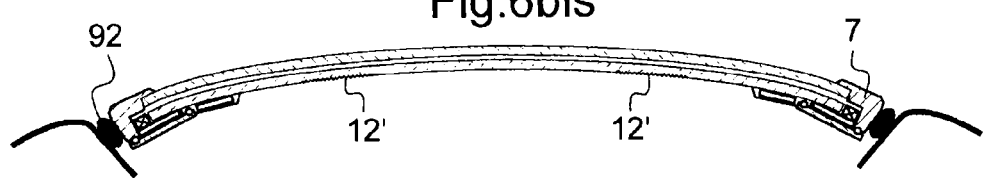
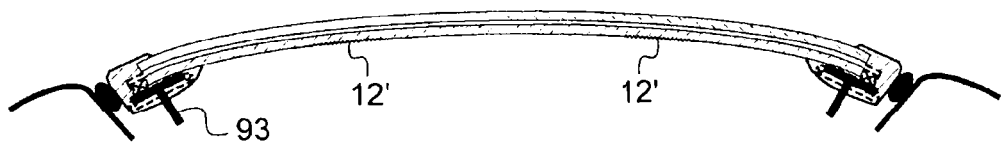

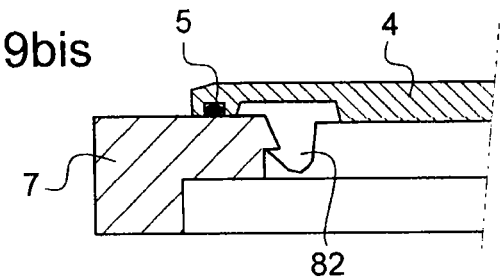
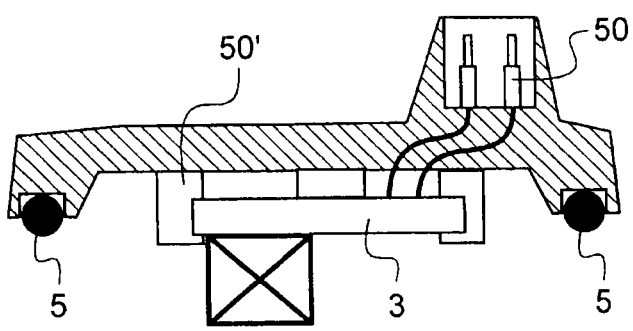
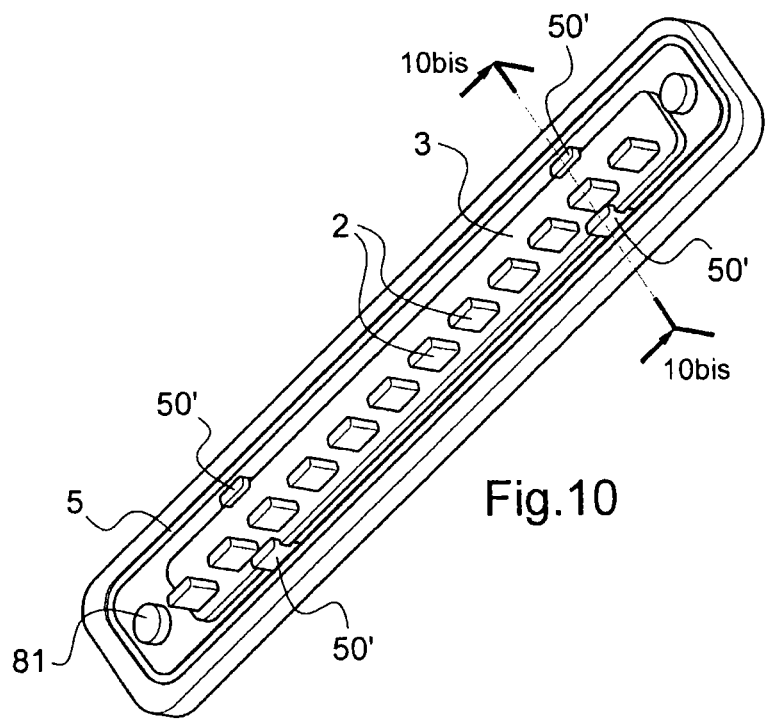
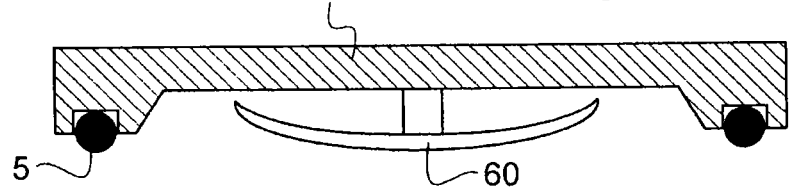

Fig.11bis
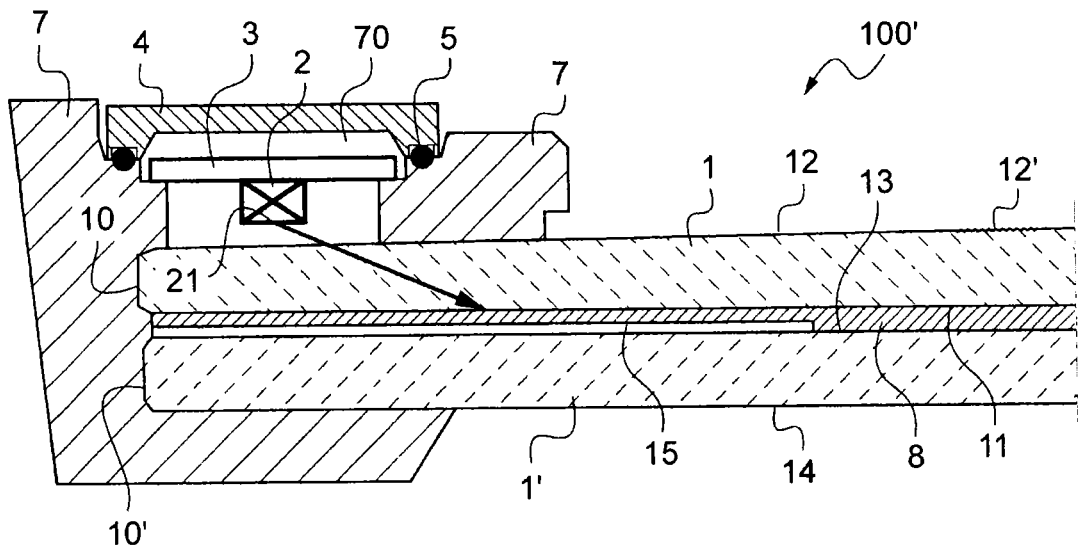
Fig.11ter
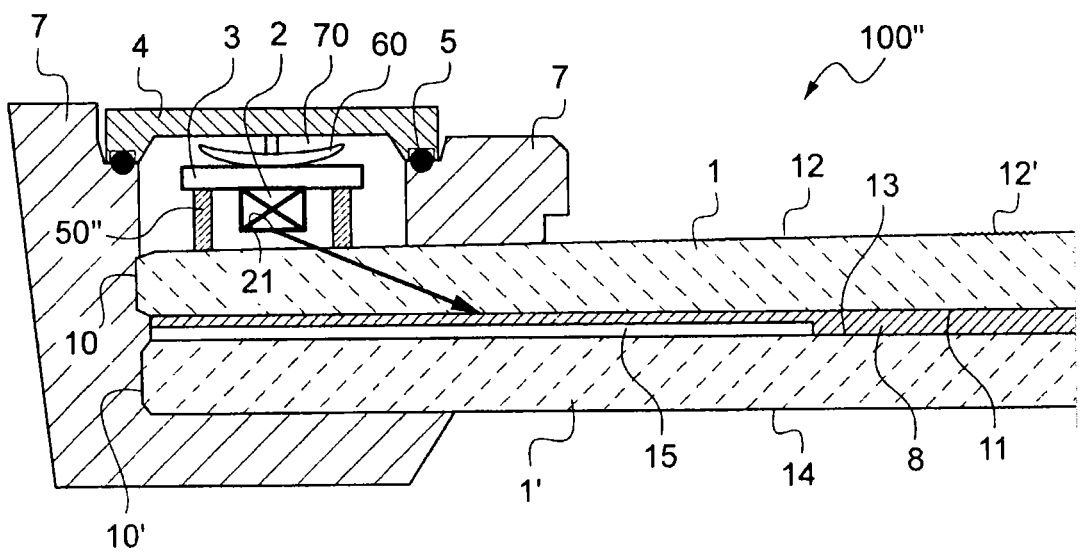

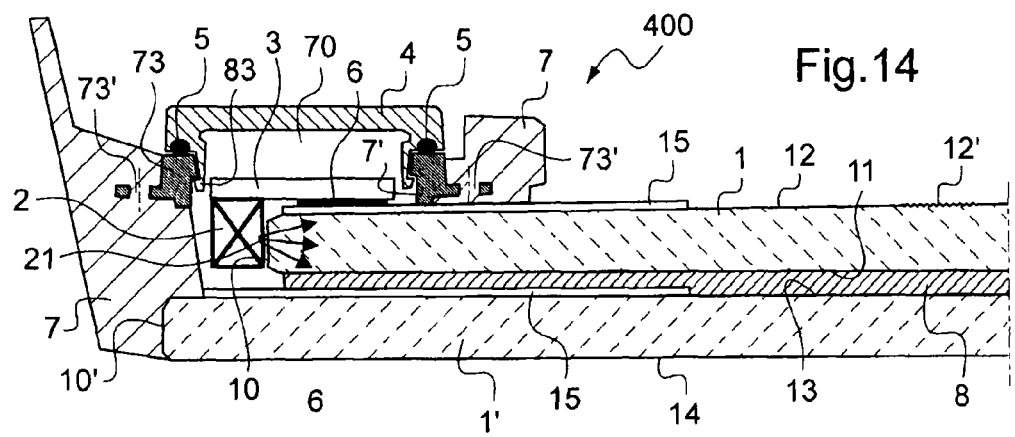
Fig.14
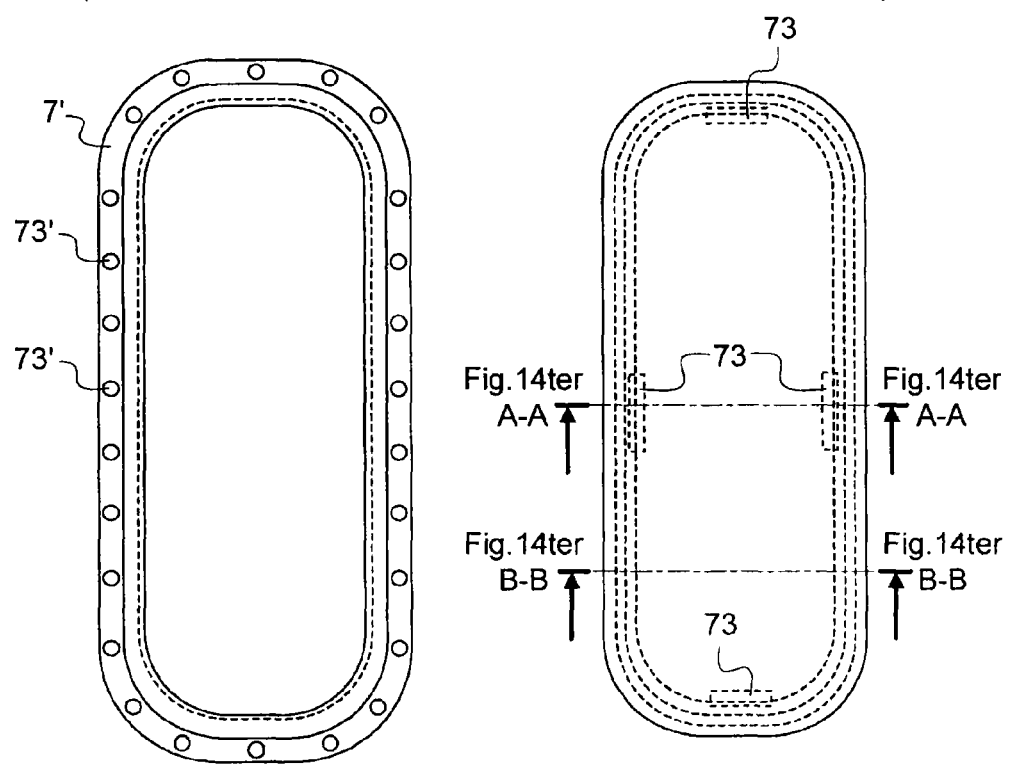
Fig.14bis

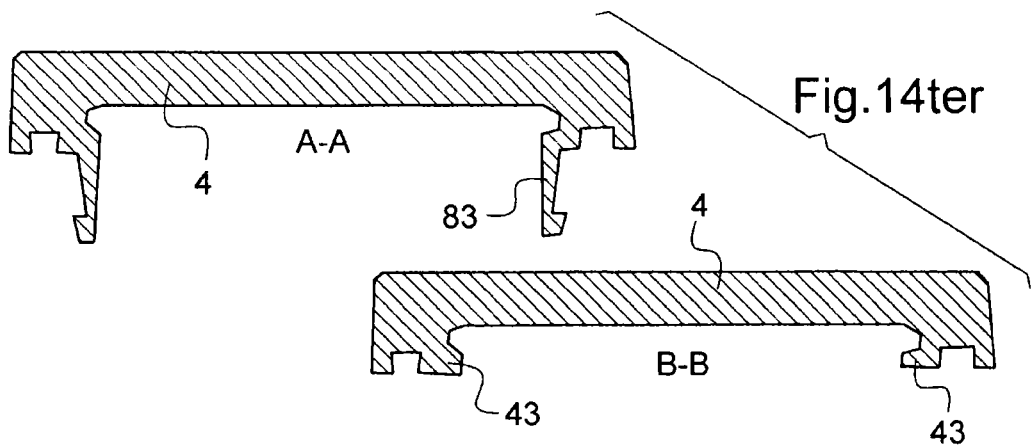
Fig.14ter
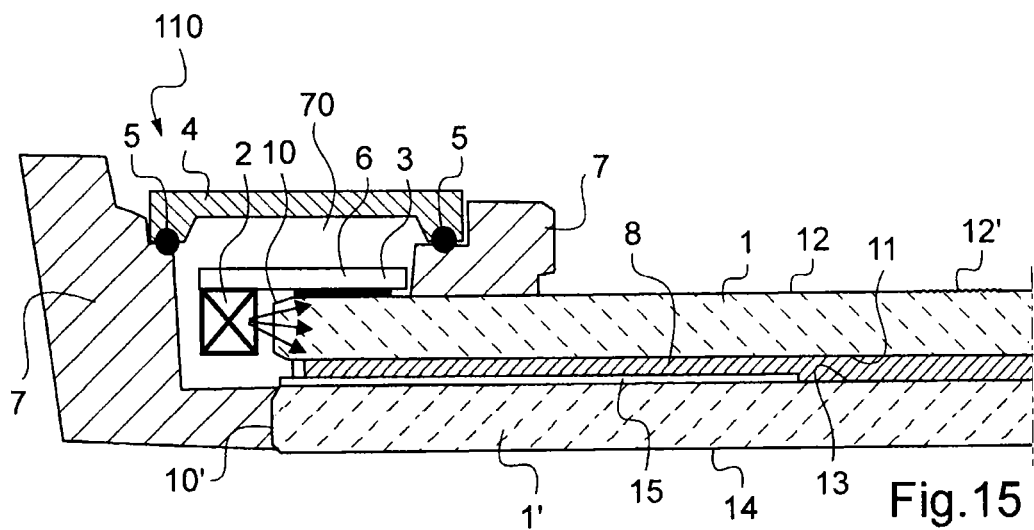
Fig.15
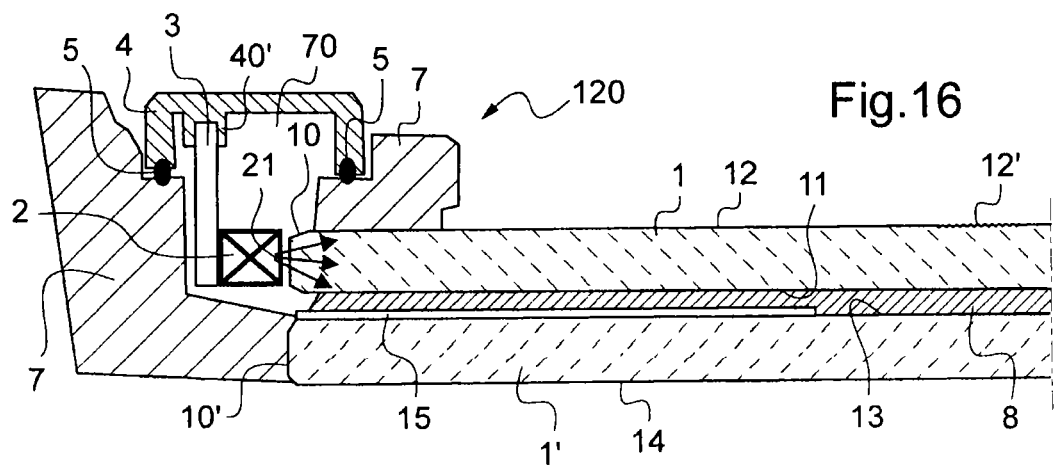
Fig.16

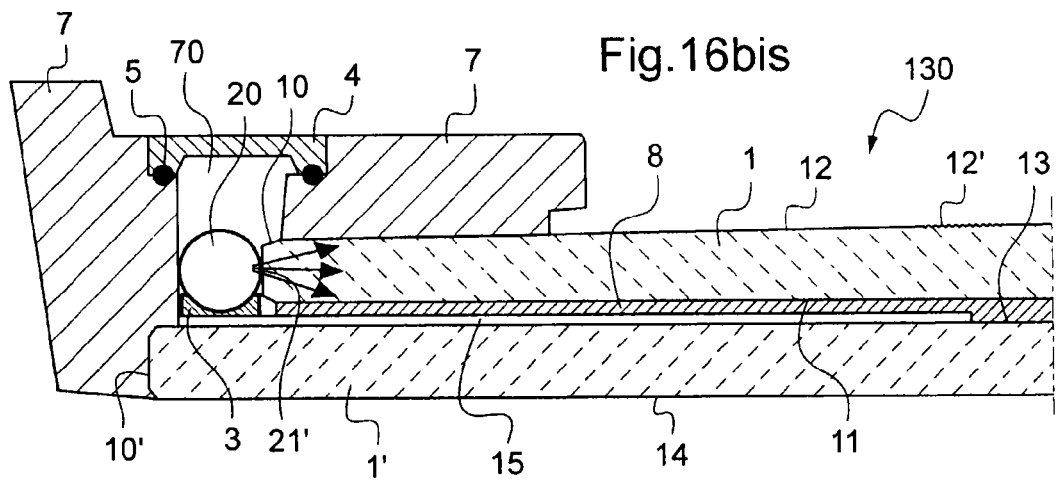
Fig.16bis
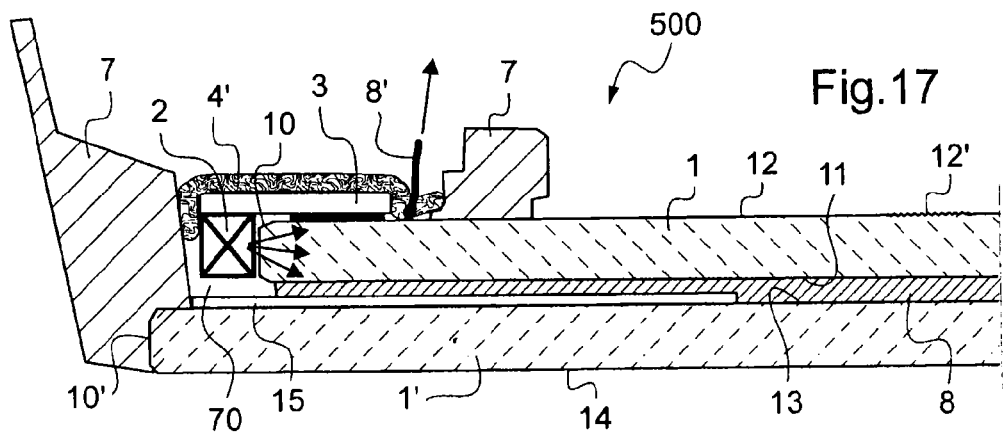
Fig.17
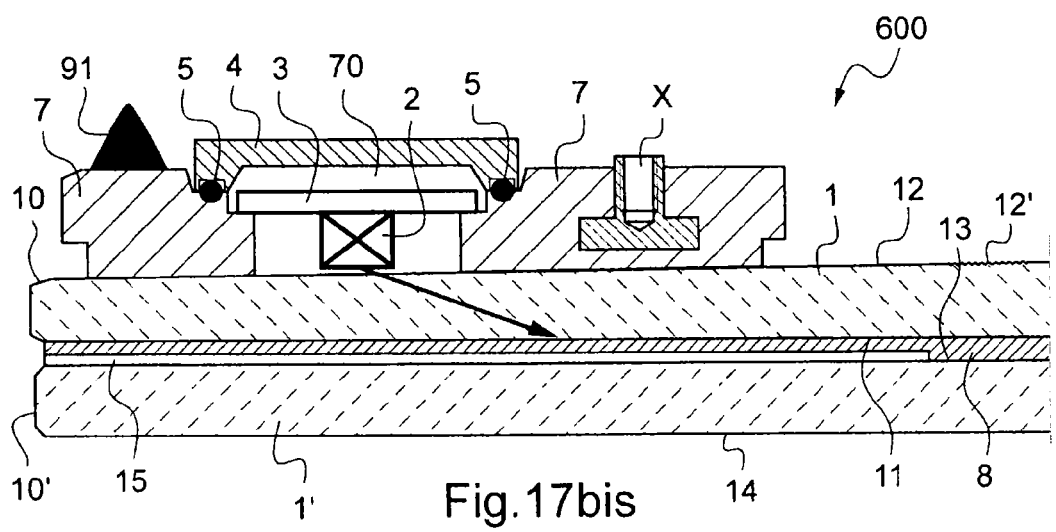
Fig.17bis

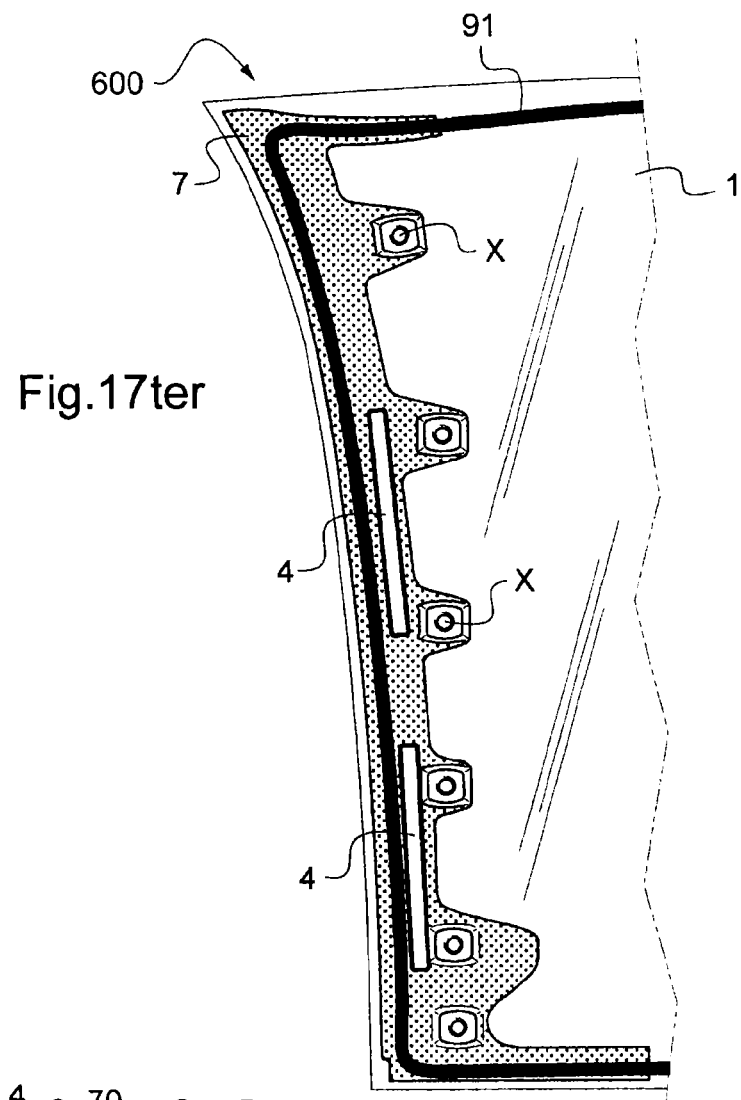
Fig.17ter
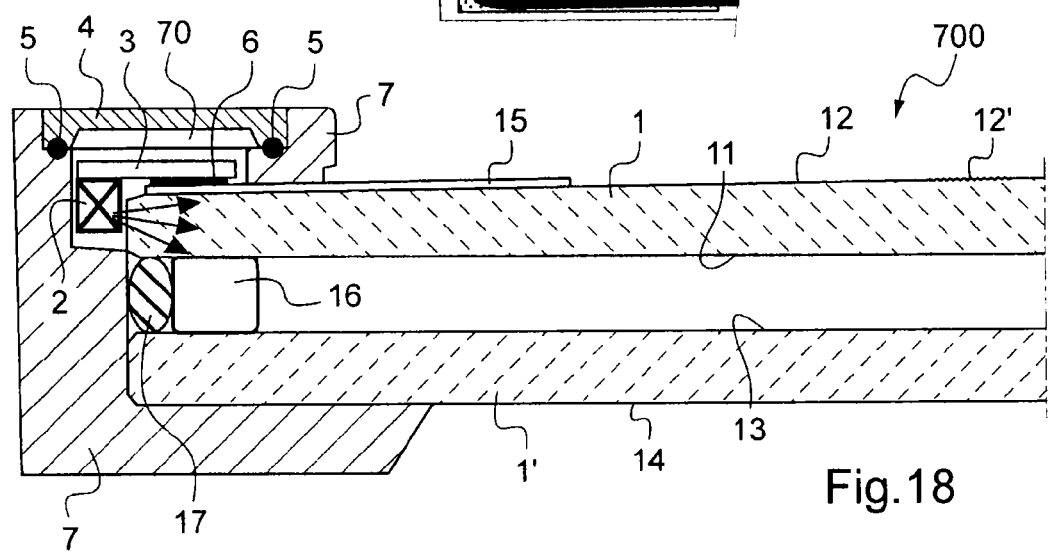
Fig.18

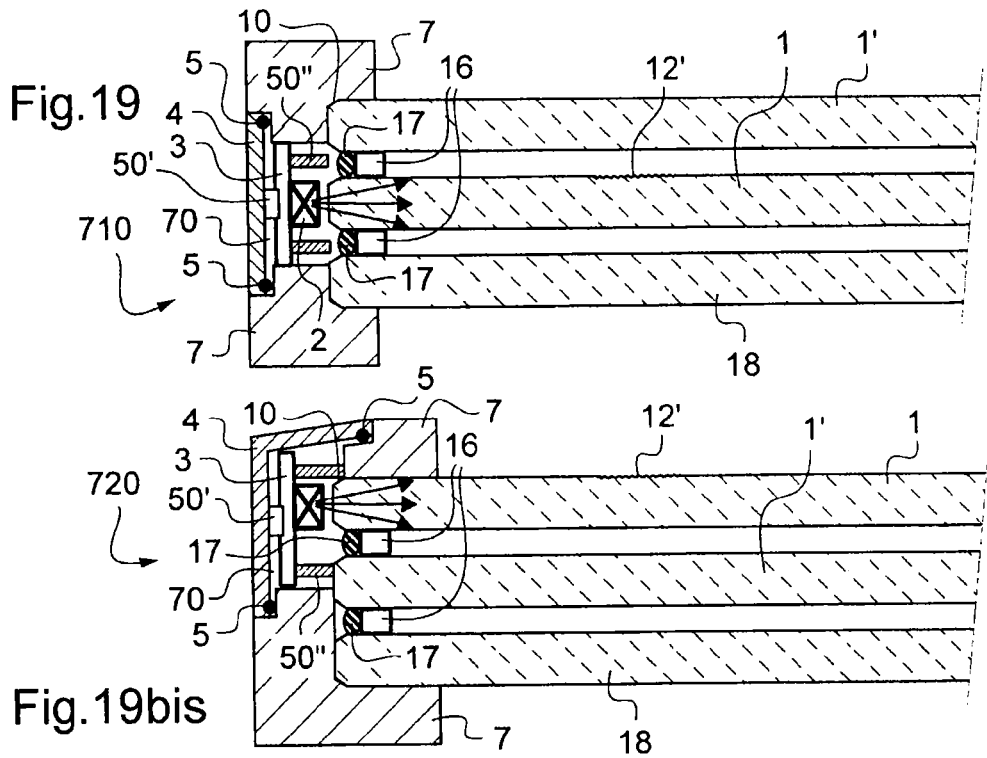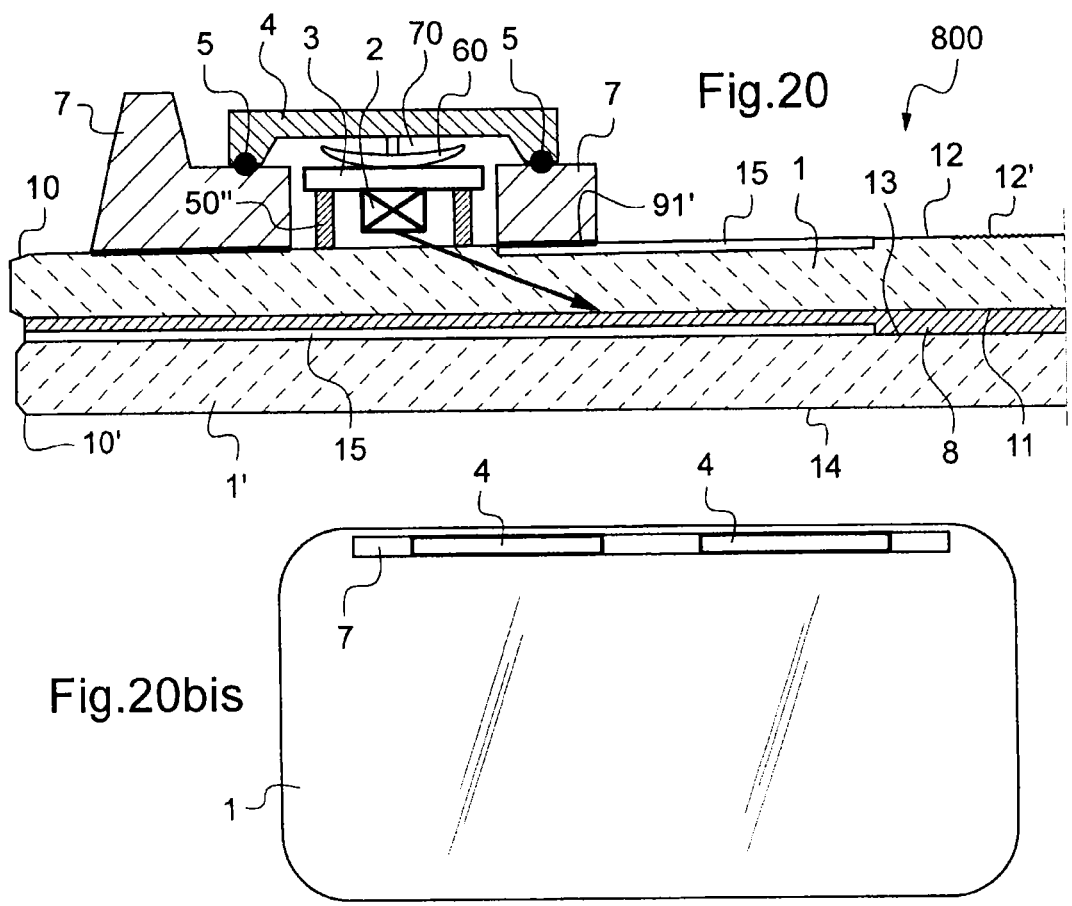

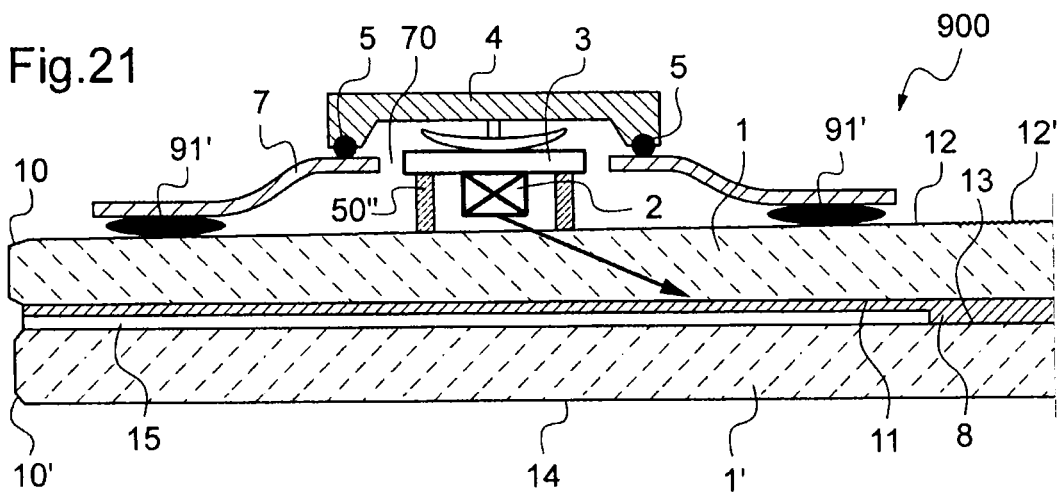
Fig.21
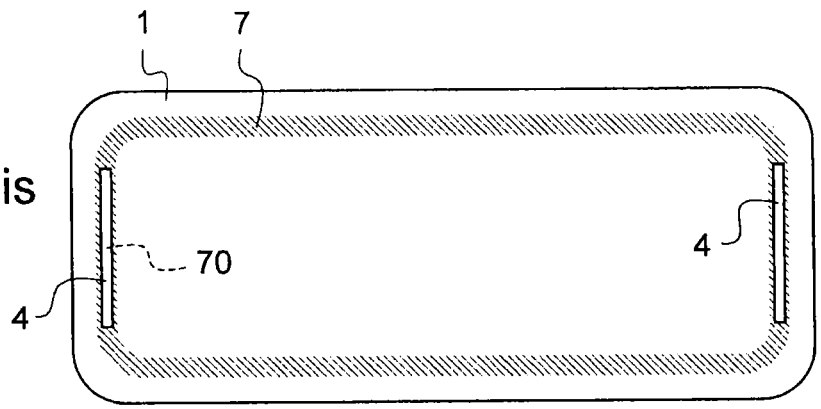
Fig.21bis
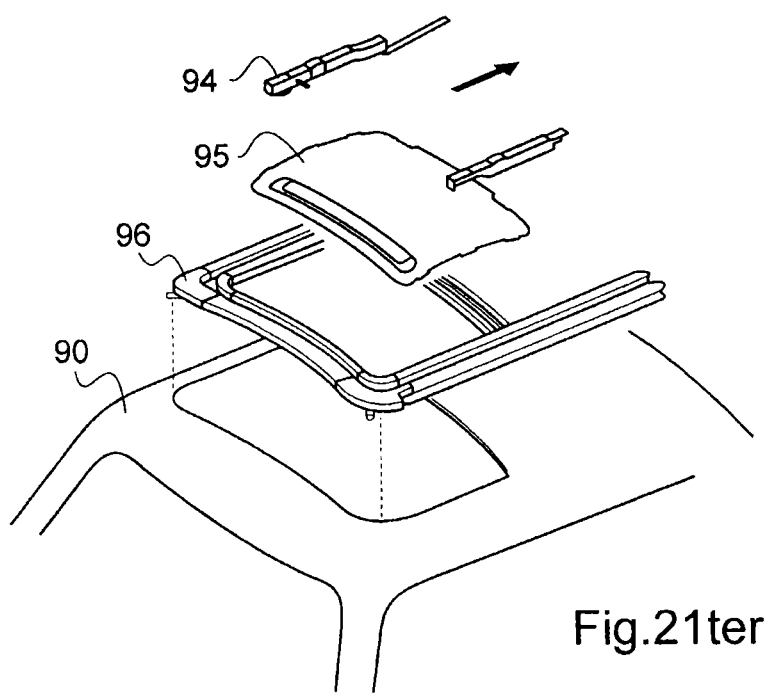
Fig.21ter

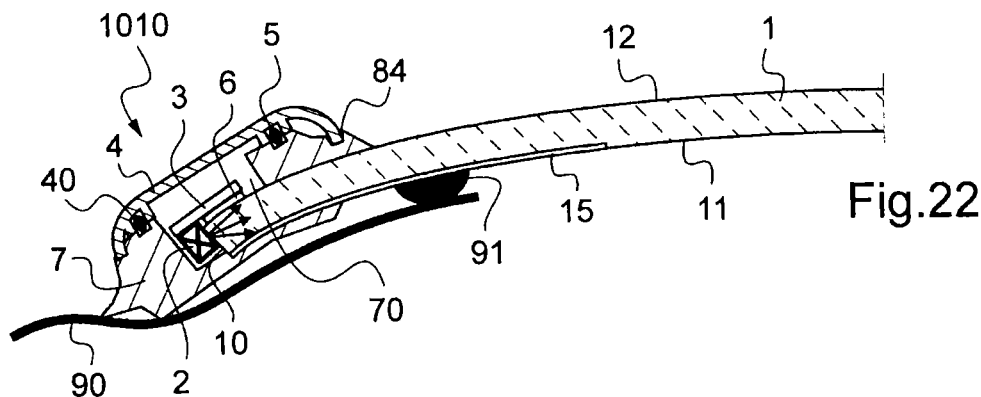
Fig.22
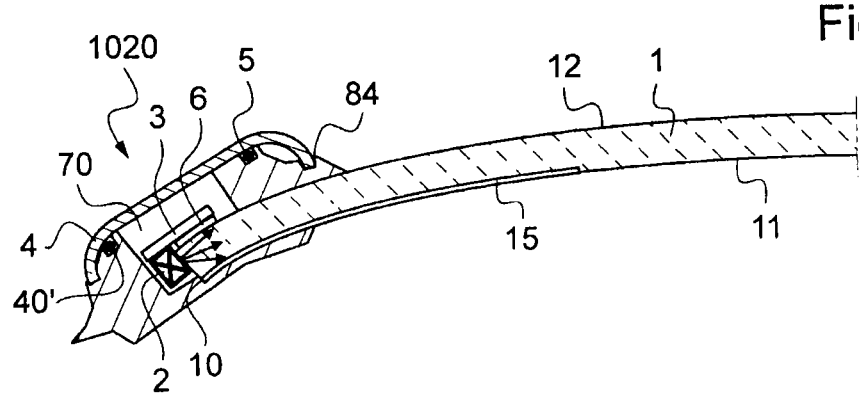
Fig.22bis
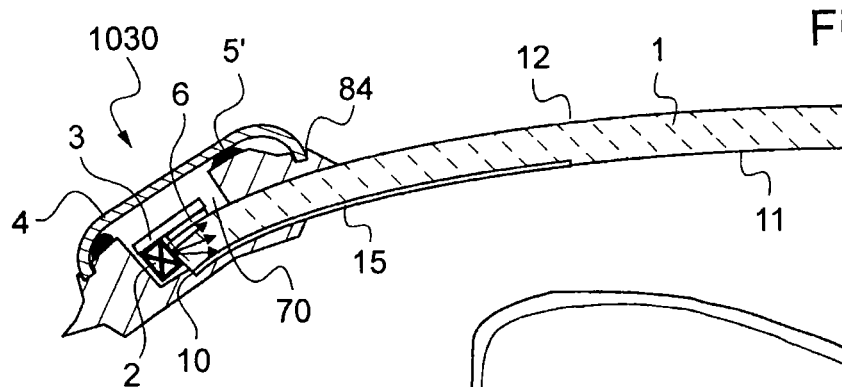
Fig.22ter
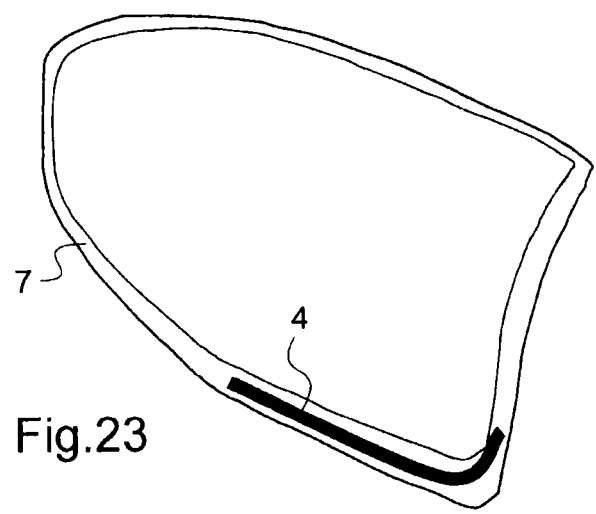
Fig.23

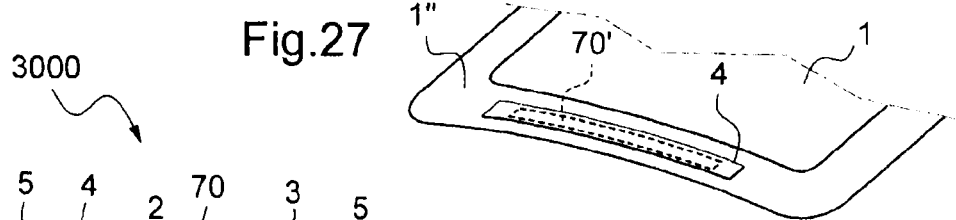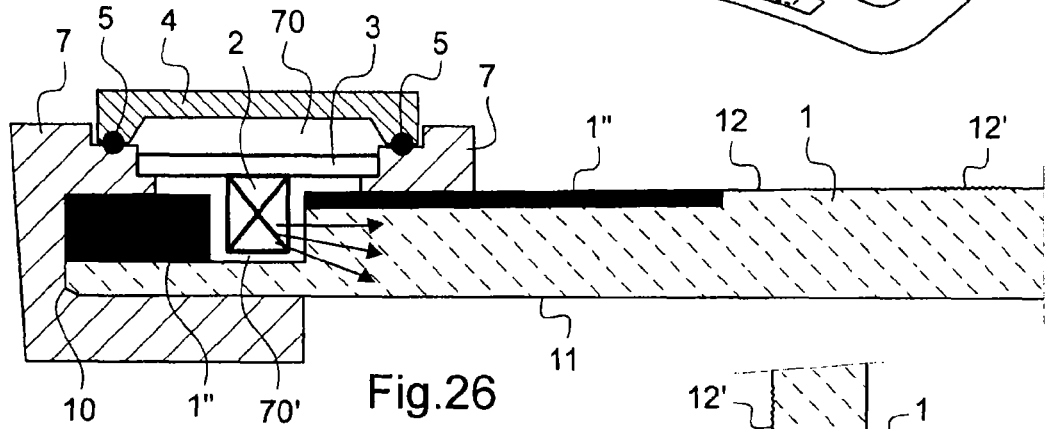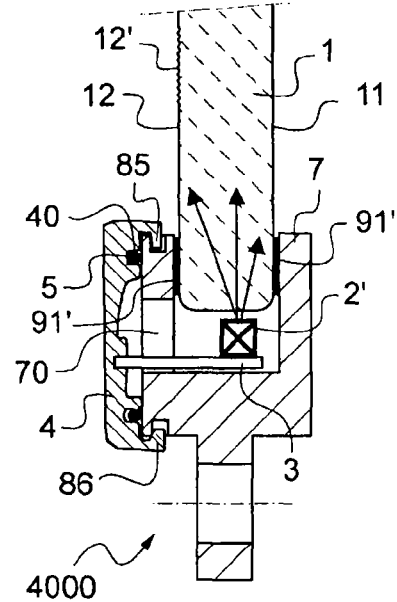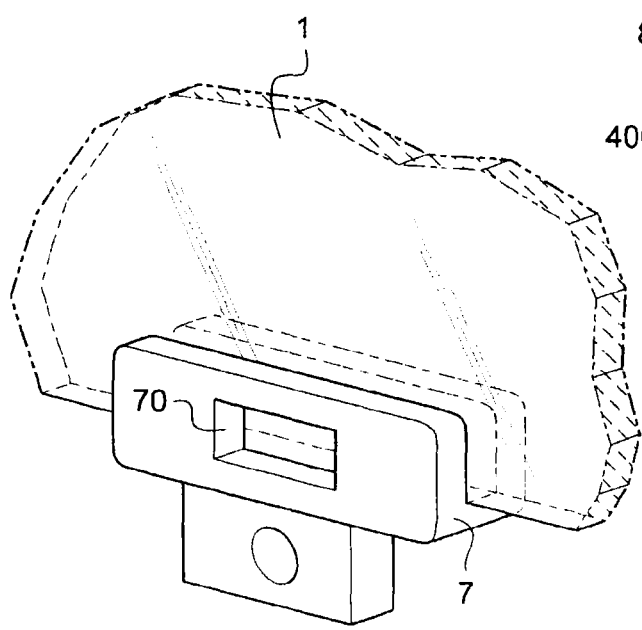

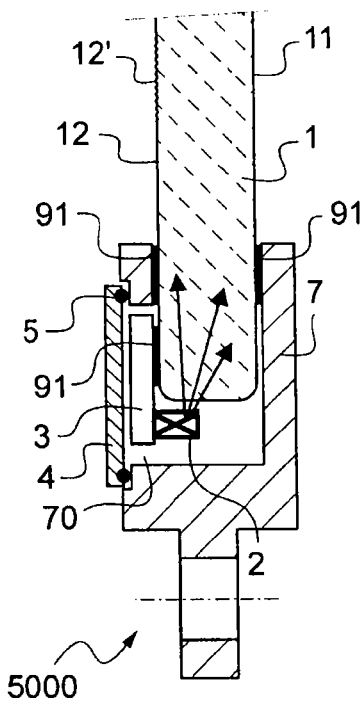
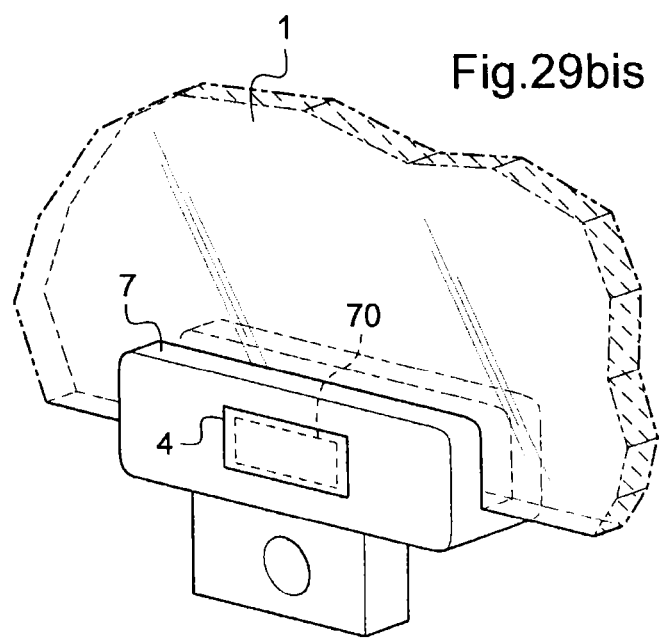
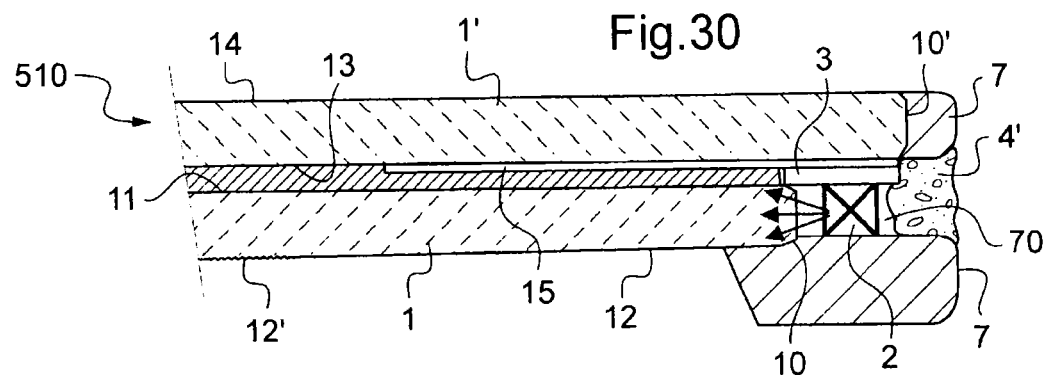

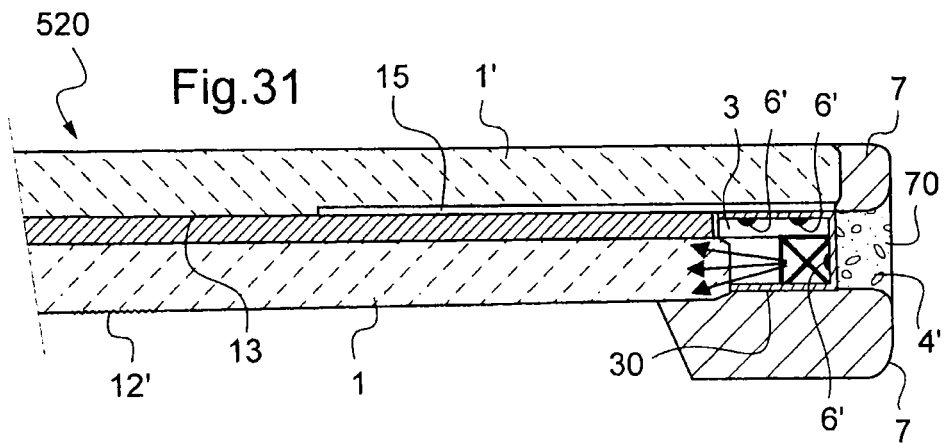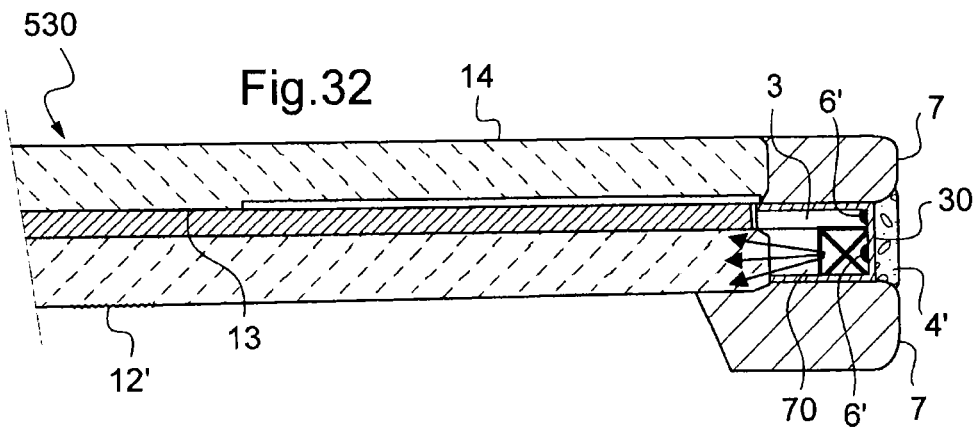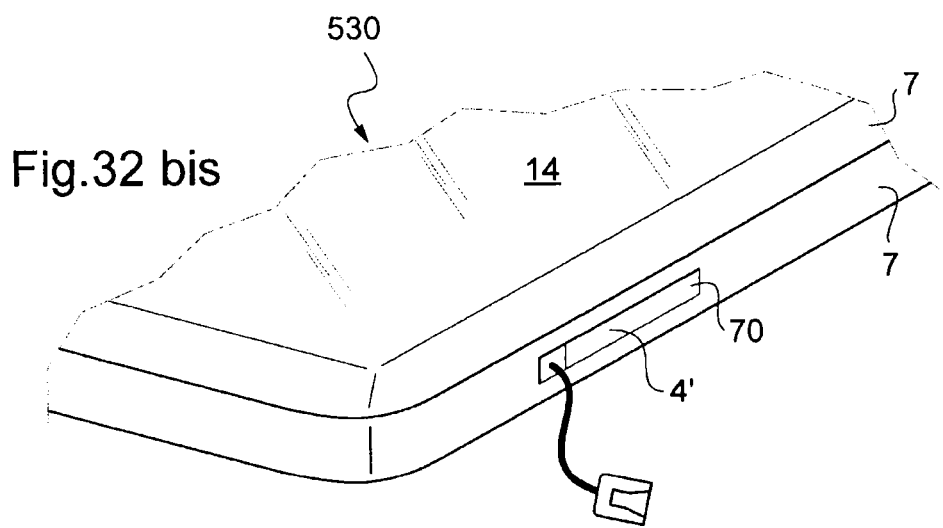

LUMINOUS VEHICLE GLAZING AND MANUFACTURE THEREOF

The present invention relates to vehicle glazings, and in particular luminous vehicle glazings, particularly having light emitting diodes, and the method for manufacturing such vehicle glazings.

Vehicles increasingly make use of light emitting diodes (LED).

Figure 8:
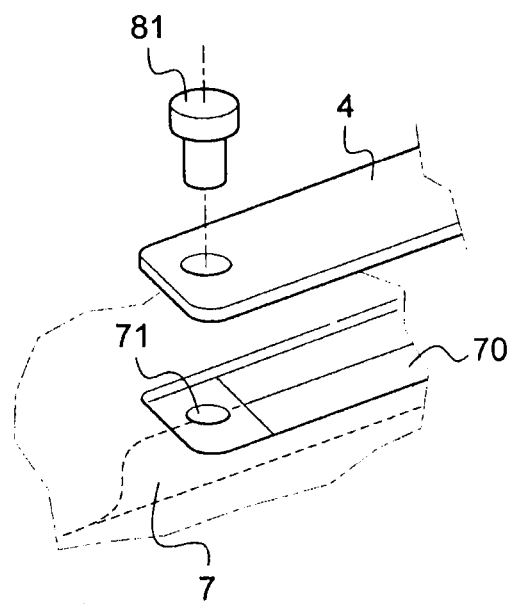

Document WO2006128941, for example, proposes a sun roof with uniform light emission on the surface by light emitting diode(s). This roof comprises a laminated structure which, as shown in FIG. 8, is composed of an outer light extractor sheet, a central transparent light guide sheet, and an inner light diffuser sheet. The light source is a plurality of light emitting diodes mounted on a lateral support fixed to the edge of the inner and outer sheets, while a hole is made in the central sheet to accommodate the diodes.

The sun roof is fastened by bonding the peripheral edges of the outer sheet to the roof structure. The diodes and the peripheral bonding zone are masked by the internal lining.

The invention proposes broadening the available range of luminous vehicle glazings.

The present invention relates in fact to a luminous vehicle glazing with an ecological and efficient light source (light emitting diodes, optical fiber(s) coupled with diodes, for example), suitable in particular for any roof configuration, and particularly roofs mounted via the exterior on the carbody roof, opening or fixed roofs.

For this purpose, the luminous vehicle glazing must be durable, compact, robust, while remaining simple, thereby meeting the specifications imposed by vehicle manufacturers.

The present invention also relates to a luminous vehicle glazing that meets the industrial requirements (in terms of output, hence of cost, production rate, automation, etc.), thereby making low-cost production possible without sacrificing performance.

For this purpose, the invention proposes a luminous vehicle glazing comprising:
- a first sheet of mineral or organic glass having a first main face and a second main face and an edge,
- a peripheral light source with an emitting face selected from an optical fiber and light emitting diodes each comprising a semiconductor chip on (at least) one support section of the diodes (the section and diode assembly being routinely called a diode array), the emitting face facing what is called the injection edge (in contact with the edge or not), or what is called an injection side of the second face (in contact with the second face or not) for propagation of the injected visible and/or ultraviolet called UV light in the thickness of the first sheet, the first sheet then playing the role of a guide for the injected light, (the injection edge optionally being partly recessed in its thickness or even with a setback, the section in particular extending beyond the injection edge or the injection side optionally being partly recessed or even with a setback),
- to form at least one luminous zone:
  - means for extracting the guided light via the first and/or the second main face, which are surface diffusion means of the first and/or second main face or volume diffusion means in the first sheet,
  - and/or when the injected light is (in particular) UV, means for converting the UV light to visible light via the first and/or the second main face, which are luminophores particularly on the first and/or the second main face (accordingly the extraction face),
- an added peripheral functional element (hence distinct from the first sheet), bonded to the first sheet, which is fluid-tight, in particular impermeable to liquid water or even water vapor, extending on the injection edge or the injection side, in particular a functional element which is selected from an overmolding or a preassembled element, (metal or polymer, preferably selected from an encapsulate, an extrudate, a seal, in particular bonded to the first sheet)
- the functional element being provided with at least one cavity (blind or through in the thickness), particularly having a closed or optionally emerging lateral contour, particularly on the second face, if facial cavity), to place the source (in or under the cavity) and to allow the injection of said light into the injection side or the injection edge,
- a covering element for covering the cavity and the source, which is fluid-tight, impermeable in particular to liquid water or even water vapor, which is selected from:
  - a cap joined by fastening means,
    - to the functional element,
    - and/or to a connecting part (7') placed (at least partly) in the cavity and connected to the functional element and/or connected to the first sheet (in particular fixed to the first sheet and/or fixed to the functional element), a connecting part that is optionally joined to the first sheet (in particular fixed to the first sheet and/or fixed to the functional element),
    - and/or to the first sheet, in particular of organic glass
  - the cap having a general face called an inner face oriented toward the cavity,
  - the cap being combined with an interfacial element, for interfacial fluid-tightness, in particular impermeable to liquid water or even water vapor, which is arranged between the cap and the functional element and/or the underlying connecting part and/or the second face,
  - and/or (in particular) arranged between the cap (particularly on the inner face or one side) and the functional element, or between the cap and the connecting part,
  - and/or (in particular) integrated with the cap (particularly on the inner face or a side) and in contact with the functional element (foam adhered to the cap or to the functional part, seal, etc.), or even (in particular) integrated with the functional element in contact with the cap (particularly the inner face),
  or
  - a fluid-tight sealing mastic covering the source (and the cavity) and sealing the added functional element.

Thus the present invention proposes a durable luminous glazing, even when the glazing is not protected by the body structure, thanks to simple and appropriate sealing means, eliminating fluid diffusion pathways.

The solution according to the invention, implementing a series of means for the tightness, is preferred to a total monolithic encapsulation, particularly of an overmolding (encapsulate, etc.) or by a coating of glue, adhesive, in which the light source (such as the LED arrays, for example) would be entirely encapsulated, a solution that makes the light source difficult to access at the risk of damaging it. Thus a source which is not completely duplicate molded is preferred.

Furthermore, total encapsulation is delicate and can damage the source, in particular the LEDs (and/or their electronic circuit) already mounted, incurring high scrap costs, unless precautions which complicate the manufacture are taken.

Similarly, the integration of the source such as an LED array is difficult or even impossible in the case of an extrusion or a molding due to the risk of deterioration of the light function.

The covering element (sealing mastic or sealed cap combined with interfacial tightness) is easy to (re)position, removable (demountable and/or detachable and replaceable at minimum cost) if necessary:
- to replace the light source (LEDs, etc.) and/or their electronic control during repair, or recycling or even
- to contend with new optical performance requirements desired by the client (change in color(s), power, frequency, control) or by new standards imposed,
- and/or to add sources (LED and/or optical fiber) and/or electronic controls in a glazing with the cavity and such sealing means according to the invention.

The invention thereby facilitates the modularity of the lighting proposed on the glazing (glazing that is illuminating or can become such, variation in color, intensity, etc.)—with regard to the logistic management of the production flows (advance assembly rather than at customer's request).

The invention reduces the impact of the integration of the source (LED, etc.) on the choice of the methods and materials, and offers a possibility of independence from a production technology, because it offers a broad range of feasible encapsulation or pre-assembly solutions.

Furthermore, the solution according to the invention is flexible, because the cap or the mastic can be installed independently of the source (for example, of the LED array or arrays).

The invention makes it possible to manufacture a luminous vehicle glazing with a functional element, added to the glazing in a routine manner, in particular manufactured by the usual techniques (extrusion, molding, etc.), the functional element being modifiable appropriately (recessed) to accommodate the LEDs in post-assembly.

The mastic (and the cap in certain configurations) is not visible after assembly on the vehicle body.

Moreover, the functional element combined with the covering element and the optional interfacial sealing element according to the invention are useful in particular for protecting the source against moisture, particularly the chips, to prevent pollution of the coupling space (dirt, organic pollution, mold, etc.) and preferably against cleaning products, or to washing by high-pressure jet. This protection must be permanent.

The wet plaster test can be performed to qualify the long-term moisture-tightness. For example standard D47 1165-H7 used in the automobile field describes the H7 wet plaster test.

This test consists in embedding the part to be tested in cotton soaked with deionized water and in enclosing the whole in a hermetically sealed bag, and then placing it in an oven at 70+/−2° C. for 7 days. The parts are then taken out, stripped of the soaked cotton and placed at 20° C. for two hours. The parts can then be observed and tested mechanically or functionally to assess the effect of the moisture on the system. This test corresponds to several years of natural aging in a humid and hot environment.

A high-pressure water jet cleaning test can also be used to test the resistance to washing by high-pressure cleaner D25 5376 used in the automobile field: pressure up to 100 bar with a nozzle/body distance up to 100 mm.

The covering element
  facing the injection side can be said to be essentially facial, that is to say, above and/or on the second face, for example an inner face substantially parallel to the second face, or offset from the second face, therefore above at least the space of the radiation emitted before injection, called the coupling space,
  or is lateral (with an inner face) facing said injection edge, in particular a side cap, facing the edge of a second sheet and/or of an optional third sheet of said glazing which is then a multiple glazing in particular with gas space(s) separating the sheet(s) or even a side mastic in particular in said glazing selected to be multiple in particular laminated.

The peripheral functional element is connected to the first sheet. The functional element may be an encapsulate, an extrudate, a preassembled seal (sealing strip), a molding, injection molding, etc.

The functional element is connected on the first sheet directly or indirectly, for example via a reinforcing, adhesive element.

The functional element can thus be connected to the glazing by any means:
  direct adhesion of the material (molded, etc.),
  pinching or toe-in,
  connecting means of the bonding type, etc.

The functional element may be single-sided, that is to say only:
  on the second face, with the cavity up to the injection side,
  on the edge of the first sheet (with the cavity up to the injection edge, and in the case of a laminated glazing or a double or triple glazing (above all in buses and trains or even for air transport) on all or part of the glazing edge.

The functional element may be:
  two-sided: on the second face with the cavity up to the injection side and on the edge or on the first face and on the edge with the cavity up to the injection edge),
  or three-sided: on the first face, on the edge of at least the first sheet (or of the glazing) and on the second face of the first sheet.

The functional element on the second face may be used to mask the source.

The cavity in the functional element may have any possible shape: oblong, oval, rectangular, etc.

This cavity has a size adapted to accommodate the source in the cavity and/or to install the source in a zone underlying the cavity, for example a hole in the first sheet.

The width of the cavity may be between 5 and 200 mm and preferably between 10 and 40 mm.

The length of the cavity may be between 10 and 1000 mm, preferably between 50 and 600 mm.

The depth of the cavity is sufficient, for example from 1 mm to 100 mm, preferably from 2 to 20 mm (or even less if facing the edge).

The luminous vehicle glazing comprises a duplicate molded polymer functional element, and preferably between the encapsulation and the glazing, in particular of mineral glass, a layer of mono-, bi- or tri-component primer, for example based on polyurethane, polyester, polyvinyl acetate, isocyanate.

As already observed, the functional element may be a polymer encapsulation, particularly 0.5 mm to several cm thick, obtained by overmolding.

In vehicle applications, the encapsulation material is generally black or dyed (for esthetic and/or masking purposes). The encapsulation may be of polyurethane, particularly PU-RIM (Reaction In Mold). Other overmolding materials are:
  flexible thermoplastics:
    thermoplastic elastomer (TPE), in particular compounds based on styrene ethylene butadiene styrene SEBS/polypropylene (PP), thermoplastic TPU, polypropylene PP/EPDM, polyvinyl chloride (PVC), ethylene propylene diene terpolymer (EPDM),
rigid thermoplastics:
polycarbonate (PC), polymethyl methacrylate (PMMA), polyethylene (PE), polypropylene (PP), polyamide (PA66), acrylonitrile butadiene styrene (ABS), and their ABS-PC alloys, polystyrene (PS), acrylonitrile styrene acrylate ASA.

The overmolding material may be dyed, filled with glass fibers.

The layer of mono-, bi- or tri-component primer is, for example, based on polyurethane, polyester, polyvinyl acetate, isocyanate, etc., for example 5 to 50 μm thick, between the encapsulation and the glazing in particular of mineral glass, because this coat promotes the adhesion to a mineral glass.

The functional element (duplicate molded) also provides a good esthetic finish and serves to integrate other elements or functions:
overmolding of frames,
reinforcing inserts or glazing fastening inserts, particularly for opening glazings,
multi-lip (double, triple, etc.) sealing profile, crushed after assembly on the body,
trim.

The duplicate molded functional element may have any shape, with or without lip.

A tubing, in other words a sealing profile with closed cells, can also be attached to the duplicate molded functional element.

Preferably for a roof, a flush encapsulation is carried out, that is to say, flush with one of the faces of the glazing, preferably the second face.

The luminous vehicle glazing comprises a functional element which is a one-sided part on the second face, in particular an overmolding or a bonded part (seal, frame), a part with a fastening support (X) of a vehicle element on the glazing or of the glazing on a vehicle element, along at least one injection side or even at least two opposite sides of the glazing.

The functional element may be a polymer seal, preferably of elastomer, in particular TPE (thermoplastic elastomer), or EPDM, a few mm thick (typically between 2 and 15 mm).

The seal may be adhesive to be secure. The seal may preferably be secured simply by pinching or by toe-in or by clipping (2 half-frames for example). The seal may be one-sided, two-sided, three-sided. The seal may form a frame. The seal may have any shape: L, U, etc. The seal may be demountable at any time. It may comprise one or more lips which are stressed after fastening.

The functional element may be metal or polymer, polypropylene (PP), polyamide (PA66), polybutylene terephthalate (PBT), etc., filled or not with glass fibers.

Advantageously, the glazing may comprise a plurality of sources, particularly groups of said diodes distributed on a plurality of sections (hence a plurality of diode arrays),
said sealing mastic being provided for each group of diodes, continuous or discontinuous mastic,
a cap and an interfacial sealing element are provided for each group (array) of diodes, said functional element comprising a plurality of cavities (for example all facial or all lateral) to accommodate the diode groups,
and/or the cap and the interfacial sealing element are common to a plurality of diode groups (arrays), accommodated in the same cavity.

The functional element preserves one or more standard functionalities for the vehicle glazing.

The functional element may optionally have specific dimensions (larger, for example) locally to customize the cavity.

The functionality (single or multiple) of the functional element may be one or more of the following:
frame of the glazing (single-face, two-face, three-face as already observed), in particular having a width on the first face of 3 to 100 mm, thickness of 10 to 40 mm, and/or
bearing part for fastening or centering elements (that is to say, for proper positioning of the glazing on the vehicle body during assembly of the glazing at the manufacturer),
sealing part impermeable to fluids (liquid water, water vapor, cleaning products, etc.) between the glazing and the vehicle body, at least limiting the passage of the fluids between the glazing and the vehicle body,
opaque and/or masking part,
and/or
(localized) part for securing mechanical elements (side window holder, etc.).

Preferably, the distance between the inner face of the cap and the first face is shorter than 10 mm.

Preferably, the distance between the outer face of the cap and the injection side or edge is shorter than 15 mm. The thickness of the cap may be less than 5 mm.

Furthermore, the space of the radiation emitted before injection, of said coupling space, naturally varies according to the source radiation diagram, defined by a main emission direction and an emission cone.

A material may be provided for filling the coupling space, material that is transparent to said radiation(s), adhesive or not, in particular:
a foam, a thermoplastic resin,
an adhesive material, such as glue, embedding the chips and securing the chips to the glazing,
a two-sided adhesive, attached to the chips and to the support by one adhesive face and bonded to the glazing by the other adhesive face.

As adhesive materials (polymers, etc.) performing a short-term sealing function if necessary, mention can be made of:
glue crosslinkable with UV,
a strip (acrylic, PU, etc.) made adhesive with acrylic glue,
a transparent glue, PU, silicon, acrylic,
a thermoplastic resin: polyvinyl butyral (PVB), ethylene/vinyl acetate copolymer (EVA), etc.

However, the invention serves to avoid the addition of a supplementary element as mentioned above (filling and/or adhesive and/or sealing material) to make the optical coupling between the LEDs (bare or pre-encapsulated) and the glazing. Such elements incur an additional cost and are liable to alter the color of the light.

Thus, advantageously, the space of the radiation emitted before injection, called the coupling space, is gaseous (one or more gases, for example air) and/or the local fluid-tight interfacial sealing element is on the periphery of the inner face of the cap or on one side of the cap, in particular the fluid-tight interfacial sealing element forms a gasket.

The sealing mastic may be adapted to avoid diffusing in the coupling space,
material adapted to avoid flowing (addition of a fabric type matrix, viscosity adjustment, etc.), for example of PU, particularly mono-component crosslinkable with moisture, underlying barrier, which may be an additional element against the mastic, for example the rear side of the support section optionally supplemented with adhesive for fastening the section, preformed mastic and peripheral bonding to the functional element, etc.

The sealing mastic may have a wire to shear the mastic (by tension).

The diodes may be (pre) encapsulated, that is to say, comprising a semiconductor chip and an envelope, for example made of an epoxy type or PMMA resin, encapsulating the chip and which has many functions: diffuser or focusing element, wavelength conversion. The envelope is common or individual.

The diodes may preferably be single semiconductor chips, for example having a size of about 100 μm or 1 mm.

The diodes may optionally comprise a protective envelope (temporary or not) to protect the chip during handling operations or to improve the compatibility between the chip materials and the other materials.

The diode may be selected in particular from at least one of the following light emitting diodes:
  a side emission diode, that is to say, emitting parallel to the electrical contacts (contact faces), with a side emission face with regard to the support,
  a diode whose main emission direction is perpendicular or oblique to the emitting face of the chip.

The emission diagram of a source may be Lambertian.

The glazing may thus integrate all the functionalities known in the field of glazing. Among the functionalities added to the glazing, mention can be made of: a layer that is water-repellent/oil-repellent, hydrophilic/oleophilic, photocatalytic antisoiling, stack reflecting heat radiation (solar control) or infrared radiation (low-emissive), antireflecting.

The support section may be on the periphery of side(s) of the glazing: on the edge of the first sheet and/or on the lower face of the first sheet and/or on the upper face of the first sheet.

The support section may have a length (and/or width respectively) smaller than the length (width respectively) of the coupling side of the first sheet.

The support section may be made from conventional PCB or metal.

The support section may have a rectangular cross section.

The total number of diodes, the power of the diodes, are selected according to the size and location of the zones to be illuminated, the light intensity desired, and the light uniformity required.

The length of the support section varies according to the number of diodes and the extent of the area to be illuminated.

The LED support section has a length, for example, of about 20 cm. The number of LED arrays (section+LED) is preferably increased to cover the area.

For greater compactness and/or simplified design, the support section may further have one or more of the following features:
  it may be thin, in particular having a thickness of not more than 1 mm, or even 0.1 mm,
  it may have a metal surface coating for electrical conduction.

A plurality of identical or similar diode support sections may be provided instead of a single support section, particularly if the zones to be illuminated are separated by long distances or to illuminate a wide zone.

A support section may be provided having a given reference size multiplied according to the size of the glazing and the requirements.

For greater compactness and/or to increase the clear zone of the window, the distance between the chip bearing portion and the first sheet is preferably not more than 5 mm, and preferably the distance between the chips and the first sheet is not more than 2 mm.

The fastening of the source to the glazing is carried out outside the coupling space, in particular outside the injection edge or the injection side and, for the diodes, by fastening the support section, in particular by bonding or two-sided adhesive or clipping (in the case of an essentially facial cap) to one of the faces of the first sheet, in particular the second face, or to one of the faces of an associated second sheet and facing the first sheet and extending beyond the injection edge for said fastening or beyond a lamination interlayer or to the inner face of the cap or to the functional element, in particular to a step for installing the support section.

The "permanent" cap fastening means may be selected from bonding, welding, or even heading, according to the type of part.

The "permanent" interfacial sealing means may be selected from bonding, welding, and also fastening means.

However, to facilitate disassembly or even replacement of the cap, the interfacial sealing element, preferably on the periphery of the cap, is a reversible glue, forming part of or constituting said accordingly reversible means for fastening the cap, preferably a glue strip arranged as a gasket particularly between the inner face of the cap and the functional element.

As reversible glue, mention can be made of epoxy resins, particularly bi-component epoxy resins, for example products of the ElectRelease™ range from EIC Laboratories.

Alternatively or cumulatively, to facilitate the disassembly and reassembly, the interfacial sealing element, preferably on the periphery of the cap, may be a compressed material, the compressive sealing of the material being achieved by a closure force of said cap fastening means, in particular the interfacial sealing element is selected from:
  a polymer seal for example made from TPE, EPDM in particular an O-ring, with lip seal(s), the seal particularly being in a groove of the cap, or a groove in the functional element or of the connecting part or of the second face,
  a seal section on the functional element, selected from polymer, for example encapsulate lip(s) or preassembled seal, particularly made from EPDM, on the inner face or on a side of the polymer cap; or a seal section on the connecting part,
  a foam, optionally made adhesive (to the cap or to the connecting part or to the connecting functional element or to the second face) in particular acrylic foam, PU, rubber (EPDM, etc.), thermoplastic elastomers, TPE, polyester, in particular monocomponent rubber polyester such as the Dynafoam product sold by Saint-Gobain Performance Plastics.

This makes the use of a sealing adhesive unnecessary.

In a first advantageous embodiment, preferably related to compressive sealing, the fastening means are reversible, and are selected from:
  clipping means, point (pins, etc.) or extended (that is to say, extending over the whole length of the cap), arranged on the inner face of the cap, preferably forming an integral part of the cap, (preferably in the sealing zone defined by the interfacial sealing element), and in particular accommodated for clipping in one or more host zones (72) of the functional element and/or of the connecting part and/or of the in particular organic first sheet,
  clipping means, for example of the hook type, forming an integral part of the cap, preferably outside in the sealing zone and in particular accommodated in one or more host zones of the functional element and/or of the connecting part and/or of the in particular organic first sheet, screw means (such as screws, bolts) extending beyond the inner face (for example housed in perforations of the cap or forming an integral part of the facial cap, optionally via blind holes), preferably in the sealing zone, in particular between the interfacial sealing element and the side of the cavity, in particular accommodated in one or more host zones of the functional element and/or of the connecting part and/or of the in particular organic first sheet.

The material, in particular polymeric, of the functional element (overmolding, added part, etc.) may not meet the clipping requirements: too flexible, etc.

Thus, the connecting part is useful and preferably forms a one-sided recessed part having a closed contour such as a frame (in contact or not with the cavity).

In a third advantageous embodiment, simple to execute, preferably related to the compressive sealing, the first sheet is made from glass in particular organic glass, in particular of PC, with a blind hole in its thickness, of the second face, (prolonging the underlying cavity) for example a setback, for accommodating the source facing the injection side.

In an organic sheet, particularly of plastic, it is in fact easier to make grooves and a peripheral recess than in a (mineral) glass sheet, particularly toughened glass.

In a preferred embodiment, the hole is present on the entire perimeter of the second face and the cap forms a frame in particular integrating said fastening means (by screwing or clipping, etc.).

The glazing comprises an element for masking the source and any interfering light (particularly at the face opposite the extraction face, close to the injection zone), and/or for masking the fastener of the glazing to the vehicle body by the second face, the masking element possibly being
- a part of the functional element, in particular a polymer encapsulation (sufficiently opaque black),
- and/or a sufficiently opaque enamel, on the periphery of the second face and/or on the first face or a face of an added sheet film facing the first face in particular when the functional element is one-sided or two-sided,
- and/or a reflecting surface (layer, etc.) on the periphery of the second face and/or on the first face or an added face facing the first face,
- and/or the first sheet is organic, bimaterial, transparent and opaque, particularly of polycarbonate,
- the opaque zone of the first sheet on the periphery of the second face and/or on the first face, forms a masking of the source and of possible interfering light (close to the injection), and/or forms a masking of the fastening of the glazing to the vehicle body by the second face.

The cap (particularly a part having a substantially planar general shape) is a trim (particularly having the color of the vehicle body), or the covering element is masked after fastening the glazing to the body, cap for example along an edge or forming a frame.

The cap may further comprise means for securing said section and/or a blind cavity for the passage of the connections along a housing in the functional element and/or means for positioning the support section of the diodes (for example grooves, local stops, etc., studs).

The cap may further comprise
- the optional integration of electrical power supply wires and connections (for example from one diode array to the next) prior to the integration of the diodes (overmolding of wires, or provide grooves in the module, etc.),
- to facilitate the output of the wires with regard to the main power supply connectors (which may be the battery, a photovoltaic source, etc.) in the capping zone by a built-in pin.

Furthermore, based on a cavity having predefined dimensions and a source-bearing cap, the invention allows good positioning of the diode with regard to the light injection zone.

Preferably, the transmission factor of the first sheet around the chip radiation peak (perpendicular to the main faces) is 50% or higher, even more preferably 70% or higher, and even 80% or higher.

The glazing may have what is called a protective layer (a sheet, film, deposit, etc.) on either of the first or second faces or extending on said face. This layer may have a dual function:
- light diffusion (for example flexible film of PU, PE, silicon optionally bonded by acrylic),
- protection from radiation (IR, UV): solar control, low emissivity, etc.
- scratchproof,
- esthetic (tinted, patterned, etc.).

Rounded sides may be preferably provided for the coupling side or sides of the first sheet. In particular, in the case in which the emitted radiation space is air, it is possible to exploit the refraction at the air/first sheet interface having an appropriate geometry (rounded side, even beveled, etc.) thereby serving to focus the rays in the first sheet.

The glass may optionally previously have undergone a heat treatment by hardening, annealing, toughening, bending.

The glazing is a single glazing, the first sheet being made of mineral or organic glass, in particular of PC, PMMA, PU, ionomer resin, polyolefin, optionally bimaterial.

The glazing may be laminated (several sheets) formed:
- from a first transparent sheet, mineral (float, etc.), or organic (PC, PMMA, PU, ionomer resin, polyolefin) glass, thick or thin,
- a lamination interlayer of a given laminating material,
- a second sheet (opaque or not, transparent, tinted, or mineral glass, or organic glass with various functionalities: solar control, etc.).

As a common lamination interlayer, mention can be made of a flexible PU, a plasticizer-free thermoplastic such as ethylene/vinyl acetate copolymer (EVA), polyvinylbutyral (PVB). These plastics have a thickness, for example between 0.2 mm and 1.1 mm, in particular between 0.38 and 0.76 mm.

The first sheet/interlayer/second sheet may in particular be selected as:
- mineral glass/interlayer/mineral glass,
- mineral glass/interlayer/polycarbonate,
- polycarbonate (thick or not)/interlayer/mineral glass.

In the present description, unless otherwise specified, glass means mineral glass.

The side of the first sheet can be cut out (trimming with recesses before quenching) from a single or laminated glazing or from a double glazing to accommodate the diodes therein.

The first and/or second sheets may have any shape (rectangular, square, round, oval, etc.), and may be planar or cambered.

The first sheet may preferably be of soda lime glass, for example PLANILUX glass from SAINT GOBAIN GLASS.

The second sheet may be tinted, for example a VENUS glass from SAINT GOBAIN GLASS.

The laminated glazing comprises a second sheet, in particular of mineral or organic glass, which is laminated by a lamination interlayer to the first sheet and preferably the edge of the first sheet comprises a marginal through cavity in the thickness of which the source is housed, or the second sheet extends beyond the injection side of the first sheet, creating a side setback of the glazing, said marginal cavity or said side setback accommodating the bottom portion (at least) of the cavity of the functional element.

The glazing may be an insulating multiple glazing, under vacuum, in particular double or triple glazing formed:

from a first transparent sheet, mineral glass (float, etc.) or organic glass PC, PMMA, PU, or even ionomer resin, polyolefin, thick or thin, from a second sheet spaced by a gas space (air or inert gas) (opaque or transparent, tinted, of mineral or organic glass having various functionalities: solar control, etc.), from an optional third sheet spaced by a gas space (air or inert gas) (opaque or transparent, tinted, of mineral or organic glass having various functionalities: solar control, etc.).

The glazing is a multiple glazing, in particular a laminated glazing, a vacuum or insulating double glazing, or even a triple glazing with the cavity essentially lateral, the cap or mastic essentially lateral, the first sheet being an outer or central sheet of the triple glazing.

For light extraction, use is made of the diffusion means, formed either by surface treatment of the glass sheet such as sandblasting, acid attack, enameling or diffusing paste deposition, or by laser etching type treatment of the glass mass.

The diffusing layer may be composed of elements containing particles and a binder, the binder serving to aggregate the particles together. The particles may be metal or metal oxide particles, the particle size may be between 50 nm and 1 µm, and the binder may preferably be inorganic for heat resistance.

In a preferred embodiment, the diffusing layer consists of particles aggregated in a binder, said particles having a mean diameter of 0.3 to 2 microns, said binder being present in a proportion of between 10 and 40% by volume and the particles forming aggregates having a size between 0.5 and 5 microns. This preferred diffusing layer is particularly described in application WO0190787.

The particles may be selected from semi-transparent particles and preferably inorganic particles such as oxides, nitrides, carbides. The particles are preferably selected from oxides of silicon, aluminum, zirconium, titanium, cerium, or a mixture of at least two of these oxides.

For example, a diffusing inorganic layer about 10 µm thick is selected.

For greater compactness and/or to reduce or increase the clear zone of the window, the distance between the emitting face and the first sheet may be shorter than 2 mm. In particular, use can be made of smaller diodes, for example chips without lens and/or without pre-encapsulation, particularly about 1 mm wide, about 2.8 mm long, and about 1.5 mm high.

The luminous zone or zones (in particular peripheral along a side of the glazing or opposite or adjacent sides, in strip(s), framing the glazing) is formed an internal ambience lighting, an internal reading lighting by side window, roof, etc., a light display of internal and/or external indications.

The luminous zone or zones, in particular are peripheral, in strip(s) surrounding the glazing.

The extraction/conversion of the radiation (and the type and/or position and/or number of diodes) is adjusted for:

ambience, reading lighting, particularly visible inside the vehicle, light indications in particular visible from the exterior:

by remote-control activation: detection of the vehicle in a parking lot or other, door (un)locking indicator, or safety signaling, for example as rear stop lights, substantially uniform lighting on the entire extraction area (one or more extraction zones, common or distinct function).

The light may be:

continuous and/or intermittent, monochromatic and/or multicolored.

Visible inside the vehicle, it may thus have a function of night lighting or data display of all types, such as drawing, logo, alphanumeric signals or other signage.

As decorative patterns, one or more light strips, a peripheral light frame, can be formed for example.

A single extractor face can be provided (preferably inside the vehicle).

The insertion of diodes in these glazings allows for other signaling functionalities as follows:

display of signal lamps intended for the vehicle driver or the passengers (example: engine temperature alarm lamp in the automobile windshield, indicator lamp of electric defrosting system, of windows, etc.), display of signal lamps intended for persons outside the vehicle (example: vehicle alarm-on indicator in the side windows), light display on the vehicle glazings (for example flashing light display on emergency vehicles, safety display with low electrical consumption indicating the presence of a vehicle in danger).

The glazing may comprise a control signal receiver diode, particularly infrared, to remote-control the diodes.

The glazing is intended for any vehicle:

side window of a land vehicle, in particular automobile, utility vehicle, truck, train, in particular with the functional element which is a securing part of a window raising system or with the trim cap, sliding or fixed roof of a land vehicle, in particular automobile, utility vehicle, truck, train, with a first optionally cambered sheet, in particular a laminated glazing, windshield of a land vehicle, in particular automobile, utility vehicle, truck, train, in particular with the luminous zone or zones (forming an "HUD" signal for example) in the enamel frame or nearby, rear window in particular in the enamel frame or nearby, window, windshield of an aerial vehicle, glazings for window, roof, of an aquatic vehicle, ship, submarine, double or triple glazing in a train, a bus.

The invention naturally also relates to a vehicle incorporating the glazing as described above.

The invention also relates to a first method for manufacturing the luminous vehicle glazing, comprising the following steps:

supply of the first sheet, its placement in a mold, formation of the functional element by overmolding by injection of a polymer encapsulation material, and in order further to form the cavity, in particular by means of a filling material (foam, etc., easily removable material), a disposable insert, a mobile mold portion, assembly of the source facing the injection side or the injection edge, in or under said cavity, covering of the cavity by the covering element and its fastening.

A solution is thus proposed for the post-encapsulation assembly of the source, in particular of the diodes, with the advantages already stated above (limitation of scrap, source more readily accessible and/or added, etc.)

The invention finally relates to a second method for manufacturing the luminous vehicle glazing, comprising the following steps:

supply of the first transparent sheet, assembly of the added functional element with said cavity, in particular a polymer seal or a metal part, and the assembly of the optional connecting part, assembly of a support section of the diodes on the first sheet and through said cavity, covering of the cavity by the covering element and its fastening.

These manufacturing methods according to the invention are compatible with industrial processes for vehicle glazing.

Figure 1:
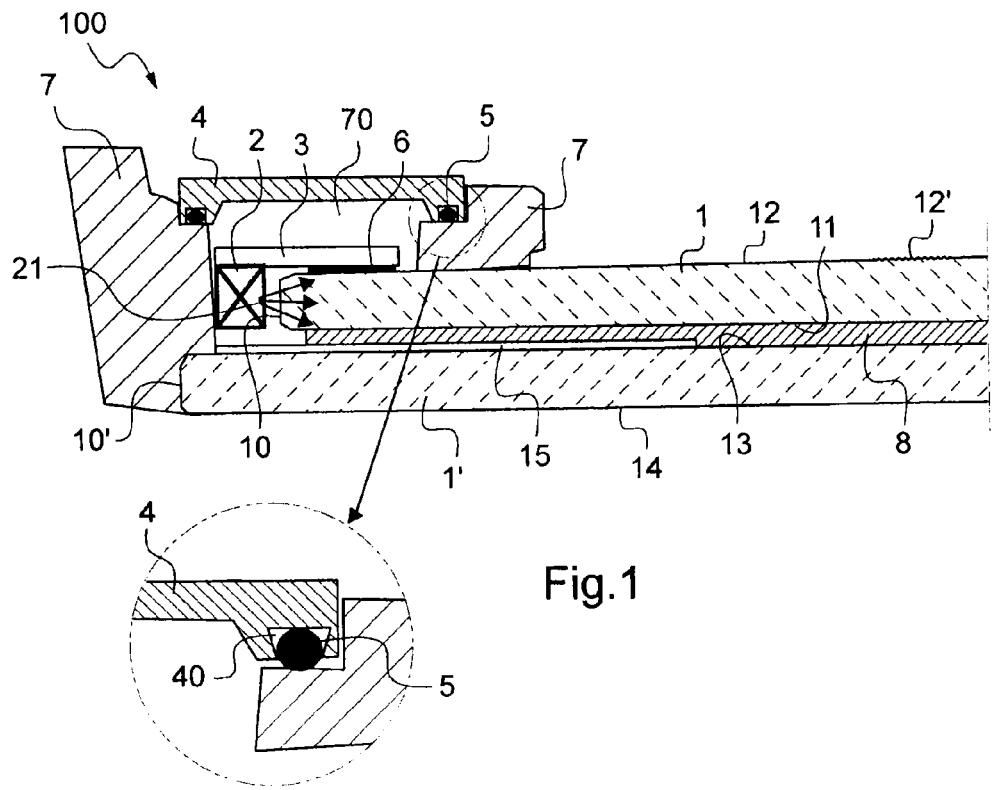
Figure 7:
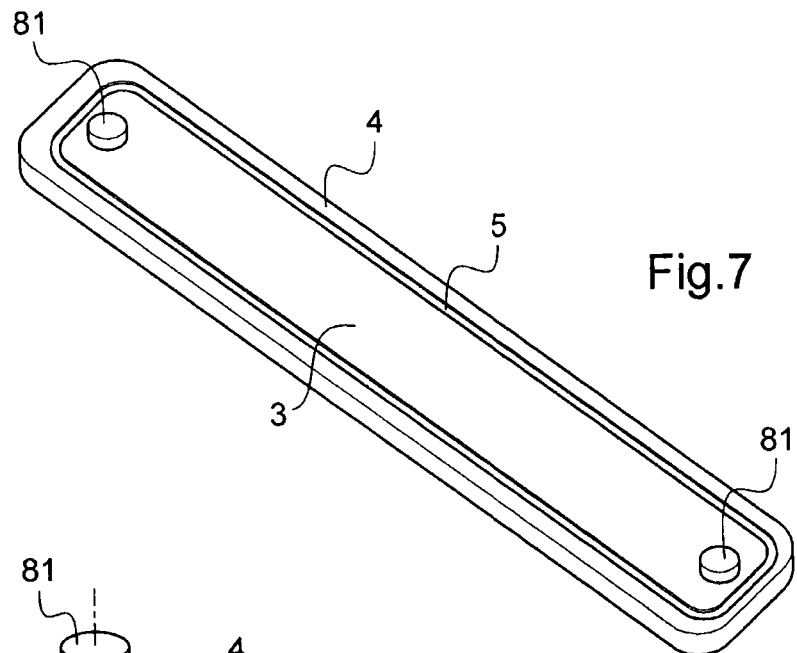
Figure 9:
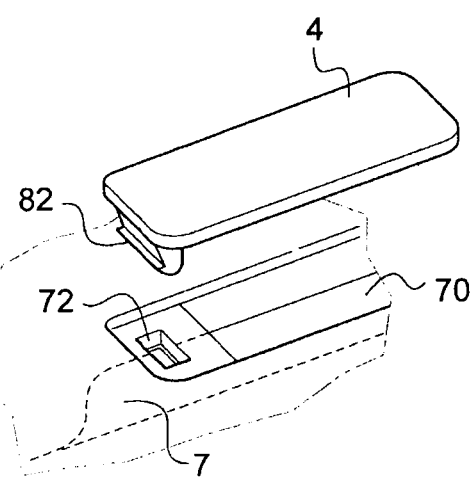
Figure 24:
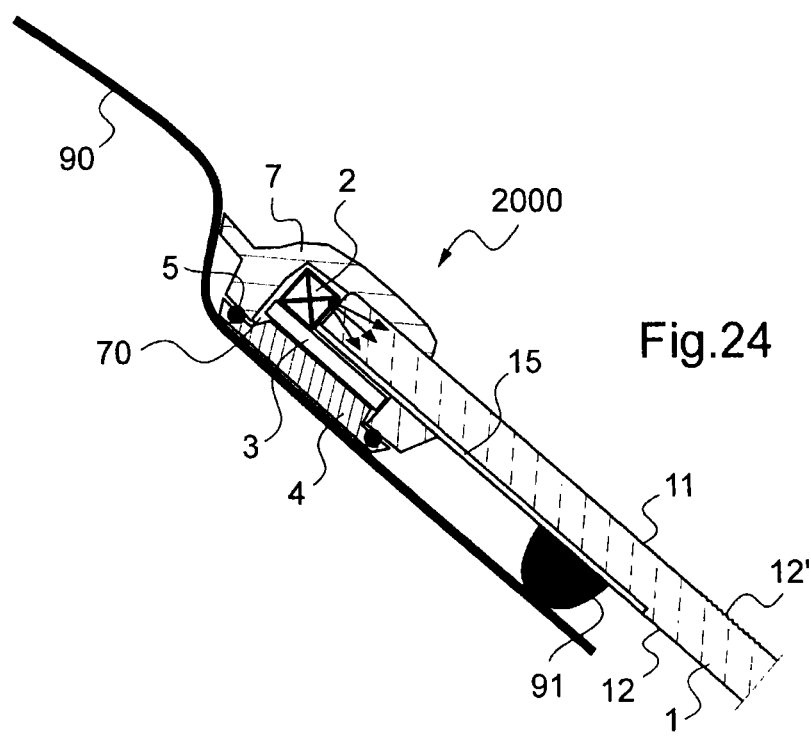
Figure 25:
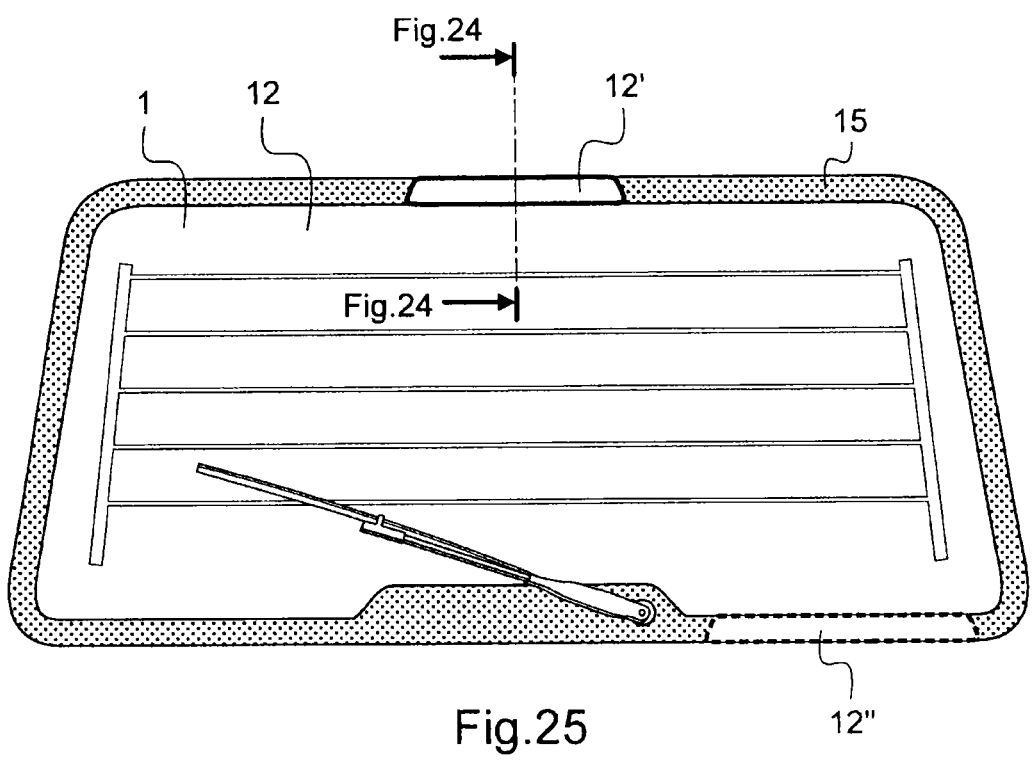

Other details and advantageous features of the invention will appear from a reading of the examples of glazings according to the invention illustrated by the following figures:

FIGS. 1, 11 bis, 11 ter, 12 to 16, 16 bis, 17, 17 bis, 18, 19, 19 bis, 20 to 22, 22 bis, 22 ter, 24, 26, 28 to 32 show partial schematic views of a cross section of the luminous vehicle glazings in various embodiments of the invention, FIGS. 2 to 5 show partial schematic plan views of the method for manufacturing the luminous vehicle glazing of the embodiment of the invention in FIG. 1, FIGS. 6, 6 bis, 6 ter show schematic views of a cross section of an automobile roof with a luminous vehicle glazing of FIG. 1, FIGS. 7 and 10 each show a schematic view from below of caps according to the invention, FIGS. 8, 9 and 9 bis show partial schematic cross sections of cap fastening means according to the invention, FIGS. 10 bis and 11 each show a schematic side view of caps according to the invention, FIG. 14 bis shows a partial schematic plan view of the connecting part used in the embodiment in FIG. 14, FIGS. 14 ter and 14 quater show respectively a partial schematic plan view and a cross section of the connecting part of the embodiment in FIG. 14, FIG. 17 ter shows a partial schematic plan view of the luminous vehicle glazing in FIG. 17 bis, FIG. 21 bis shows a partial schematic plan view of the luminous vehicle glazing of FIG. 21, FIG. 21 ter shows a sun roof which can use the vehicle glazing of FIG. 21, FIG. 25 shows a schematic front view of the luminous vehicle glazing in the embodiment of the invention in FIG. 24, FIG. 27 shows a partial schematic side elevation view of the luminous vehicle glazing in the embodiment of the invention in FIG. 26, FIGS. 28 bis and 29 bis show schematic elevation views of the luminous vehicle glazings of FIGS. 28 and 29, FIG. 32 bis shows a partial schematic plan view of the luminous vehicle glazing in the embodiment of the invention in FIG. 32.

For the sake of clarity, the various elements of the objects shown are not necessarily reproduced to scale.

Furthermore, in the figures, the light rays do not necessarily strictly follow the laws of optics.

FIG. 1 shows a partial schematic cross section of a luminous vehicle glazing 100 in a first embodiment of the invention.

This glazing 100 comprises a laminated glazing comprising:

a first transparent sheet 1, for example rectangular, having a first main face 11 and a second main face 12, and an edge 10, for example a sheet of silica soda lime glass, having a thickness of 2.1 mm, a second glass sheet 1', optionally for a solar control function, tinted (VENUS VG10 glass for example from Saint-Gobain) and/or covered with a solar control coating, having a thickness of 2.1 mm.

The second glass sheet is laminated 1' by a lamination interlayer 8, for example a 0.76 mm thick PVB 8.

Two support sections 3 of light emitting diodes 2 extend on the border, for example longitudinal border, and are fastened on the periphery of the second face 12 of the first glass sheet 1 by a bonding 6 or a two-sided adhesive.

Each support section 3 is monolithic, thin, having a thickness of 0.6 mm (preferably 5 mm max), 7 mm wide, 20 cm long. It may have a rectangular section, and be made of metal or conventional PCB. The bearing length of the section on the second face 12, may typically be lower than 7 mm.

Alternatively, the diode support section has an L, U, J cross section, etc.

The light emitting diodes each comprise an emitter chip 2 for emitting one or more radiations in the visible guided in the first sheet 1. The diodes are small, typically measuring a few mm or less, in particular about 2×2×1 mm, without optics (lens) and preferably not pre-encapsulated to reduce the size to the minimum.

In the configuration shown, the emitting face is lateral (parallel to the section 3). The distance between the side emitting face and the edge is reduced to the minimum, for example 5 mm. The distance between the side emitting face and the edge is 1 to 2 mm. The main emission direction is perpendicular to the face of the semiconductor chip, for example with an active layer having multi-quantum wells, of AlInGaP technology or other semiconductors. The light cone is a +/−60° Lambertian cone.

The light extraction 12' can be carried out via the second face 12 which is, for example, the inner face of the vehicle, particularly in the case of a roof.

Alternatively, LED UVs are selected, particularly in the UVA, to excite the luminophores on face 12 for example.

Extraction 12' is carried out by any diffusion means on the surface of the second face 12: sandblasting, acid attack, diffusing layer, screen printing etc., or alternatively, by laser etching in the first sheet 1.

For a given group of diodes, an emitted radiation space is defined between each diode (chip) and the edge of the first sheet, called optical coupling space, which is preferably a gaseous medium, typically air, free of glue.

Each chip and the emitted radiation space must be protected against all pollution: water, chemical, etc., for the long-term and also during manufacture of the glazing 100.

In fact, in a manner known per se, it is useful to provide the glazing with a polymer overmolding 7, for example about 2.5 mm thick, on the border of the glazing, and preferably along the whole perimeter of the glazing (laminated here) and at least the second face 12.

For a flush type encapsulation, for roofs in particular, it is preferable to leave the face 14 of the second glass 1' free. The encapsulation 7 is then referred to as two-face encapsulation.

To mask the source, or even eliminate the interfering light exiting upward, via the sheet 1', a peripheral masking element 15 can be used on the face 13, for example, an opaque enamel (black, etc.) and/or a reflector (silvered, etc.).

This peripheral masking element 15 can also serve to mask the fastening to the body.

The section may also be fixed to the face 13 which can mask the source in particular.

Alternatively, the encapsulation 7 is then referred to as three-face and the masking element 15 may optionally be removed.

The overmolding 7 conventionally serves as a good esthetic finish and/or allows the incorporation of other elements or functions (reinforcing inserts, etc.).

The overmolding 7 has, for example, a lip seal between the glazing and the vehicle (not shown in FIG. 1, cf. FIG. 6).

The overmolding 7 is, for example, made from black polyurethane, particularly of PU-RIM (Reaction In Mold).

Figure 2:
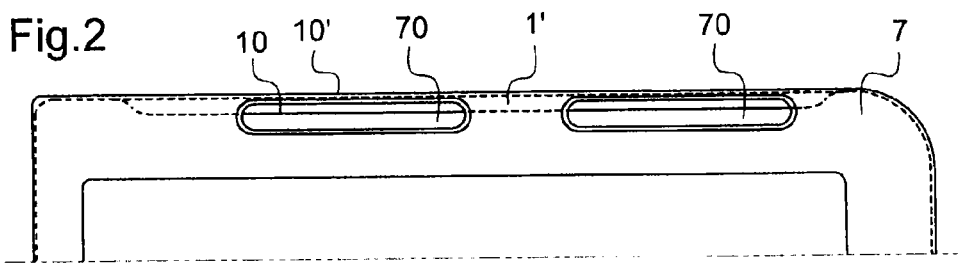
Figure 3:
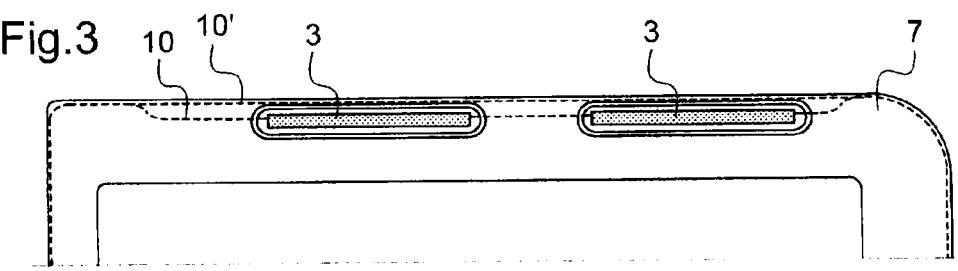

The overmolding 7 according to the invention has two cavities 70, for example oval, as shown in FIG. 2. The cavities 70 each accommodate a diode array (the diodes on the support section 3) as shown in FIG. 3.

The overmolding 7 participates in protecting the diodes, hence in the long-term fluid-tightness (liquid water, cleaning product, or even water vapor, etc.), while preserving their original functionalities.

To minimize the width of the overmolding against the edge of the glazing, for example a width lower than 10 mm, the first sheet 1 also has a marginal or so-called side cavity, which marginal cavity therefore terminates at the limit of the longitudinal side of the sheet (injection side) and has a low cutting radius to have a long positioning zone in the cavity, as shown by dotted lines in FIGS. 2 to 5. This side cavity accommodates the bottom portions of the two cavities of the overmolding 70.

In an alternative with a preassembled seal replacing the overmolding, such a cavity also serves to have the largest possible window clarity.

To complete the fluid-tightness of each diode array, the following are also used
- a cap 4 for covering the diodes extending along an edge of the second face 12, extending beyond the injection edge 10; cap with a general so-called inner face oriented towards the first sheet,
- an interfacial element 5 for interfacial fluid-tightness, arranged between the inner face of the cap and the upper face (free outer face) of the functional element 7 close to the cavity 70, an interfacial element which is a seal, of EPDM, in the form of a 5 mm wide gasket in a groove 40 on the inner face of the cap (cf. detail view in FIG. 1).

The cap 4 is a plastic part having a general planar shape, a rectangular contour (with optionally rounded edges) as shown in FIG. 4 or FIG. 7.

The cap is parallel to the first sheet.

As shown in FIGS. 7 and 8, the cap 4 is joined to the functional element 7, by reversible fastening means, for example two screws 81, passing through the cap and extending beyond the inner face.

These screws are accommodated in local back drafts of the functional element (7), that is to say, threaded holes 71 and preferably between the seal strip 5 and the cavity side.

The interfacial sealing element 5 is a compressed material, the compressive tightness of the material being obtained by a closure force of said cap fastening means 81.

The cap 4 is thus easily demountable in order to insert the diodes or replace them.

As the first alternative cap, shown in FIGS. 9 and 9bis, the cap fastening means are two clipping means 82 accommodated in two local back drafts 72 of the functional element 7, preferably between the seal strip 5 and the cavity side.

In a second alternative cap (alternative or cumulative with the first) shown in FIGS. 10 and 10 bis, the support section 3 of the diodes 2 is secured by the cap 4, for example by hooks 50'.

The cap design therefore serves to integrate the diode array and also allows focusing of the array, that is to say, the correct positioning of the array with regard to the injection edge.

The cap may further comprise surfaces or stops for reference in the overmolding housing.

Furthermore, the cap is provided with a blind or through cavity 50 (made tight by foam or seal, etc.) for passage of the connections.

In a third alternative cap (alternative to the second alternative) shown in FIG. 11, the inner face is provided with means for accurate positioning, hence alignment, 60, of the diode support section 3, in the form of a pusher 60 (concave shape towards the opposite side of sheet 1) bearing on the outer face of the section 3.

The design of the cap 4 hence comprises an element 60 allowing the application of a force to the diode array previously fixed to the sheet.

The diodes can be selected to emit white or colored light for ambience or reading lighting, etc.

A plurality of arrays can obviously be provided on distinct sides, and/or with distinct functions (choice adapted to the power, the light emitted, the position and extent of the extraction zones).

The extraction, for example a diffusing layer 12', may form an ambience lighting.

The glazing 100 may, for example, form a fixed sun roof of a land vehicle, or alternatively of a boat, etc.

The roof is assembled from the exterior as shown in FIG. 6, on the body 90 via an adhesive 91. Preferably, the functional element 7 then has a lip seal.

As the first alternative shown in FIG. 6 bis and FIG. 6 ter, the encapsulation of the glazing 100 has been modified as follows:
- the lip is eliminated,
- an EPDM tubing 92 is added against the encapsulation 7, in other words, a closed-cell sealing section or a multi lip sealing section, the section being crushed after assembly on the vehicle,
- fastening inserts are added to the glazing 93 for opening it.

The first sheet 1 (the second face) is on the inside of the vehicle. The extraction is preferably via face 12.

As shown in FIG. 5, the creation of a cavity/cavities 70 and the integration of diode arrays with the cap 4 is compatible with the use of such inserts 93.

FIG. 11 bis shows a partial schematic cross section of a luminous vehicle glazing 100' in an alternative of the first embodiment of the invention shown in FIG. 1.

The glazing 100' differs from the glazing 100 in that the injection edge is replaced by an injection side, hence with a cavity 70 a diode 2 array 3, a cap 4 (essentially or even entirely) above the second face. The overmolding is a three-face molding.

FIG. 11 ter shows a partial schematic cross section of a luminous vehicle glazing 100" in an alternative of the first embodiment of the invention.

The glazing 100" differs from the glazing 100' by the presence of stops 50" for positioning the diodes and the pusher already described in FIG. 11.

Figure 12:
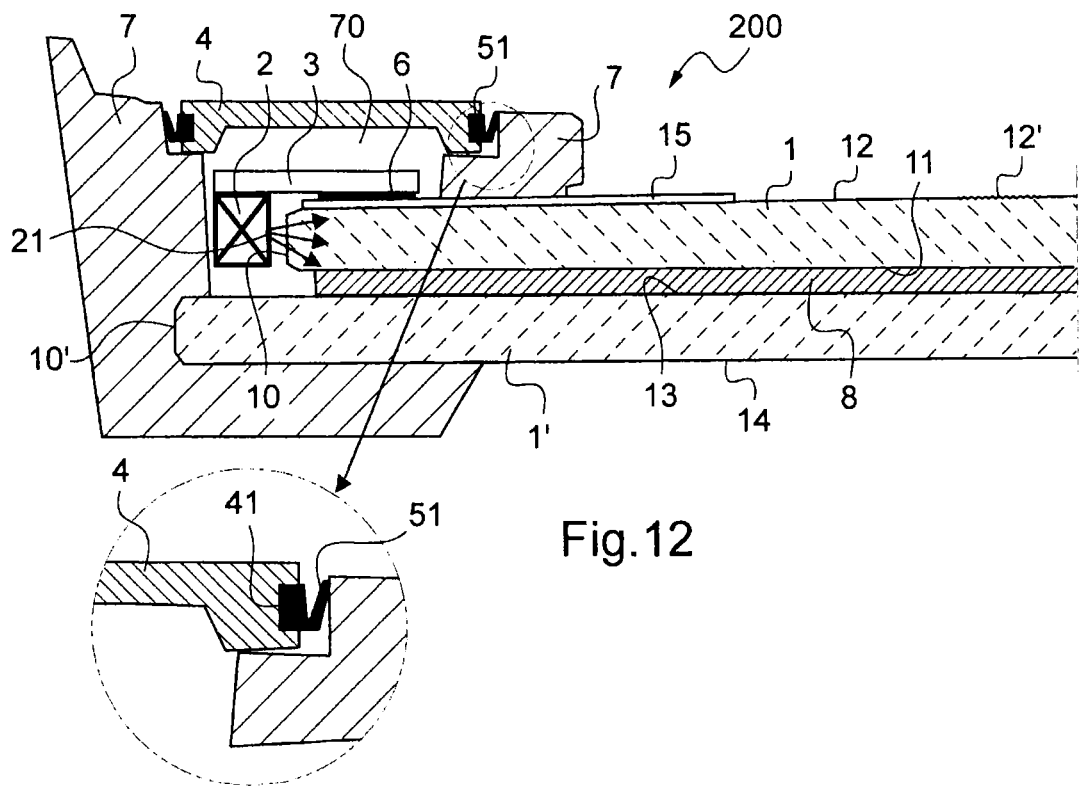

FIG. 12 shows a partial schematic cross section of a luminous vehicle glazing 200 in a second embodiment of the invention.

The luminous vehicle glazing 200 differs from the glazing 100 by the position and type of interfacial sealing element.

In fact, it concerns a seal 51, of elastomer rubber or TPE in a groove 41 arranged on the outer side of the cap 4 (see detail view) and in contact with a side of the cavity of the functional element 7.

The sides of the inner face bear simply on the functional element 7.

Figure 13:
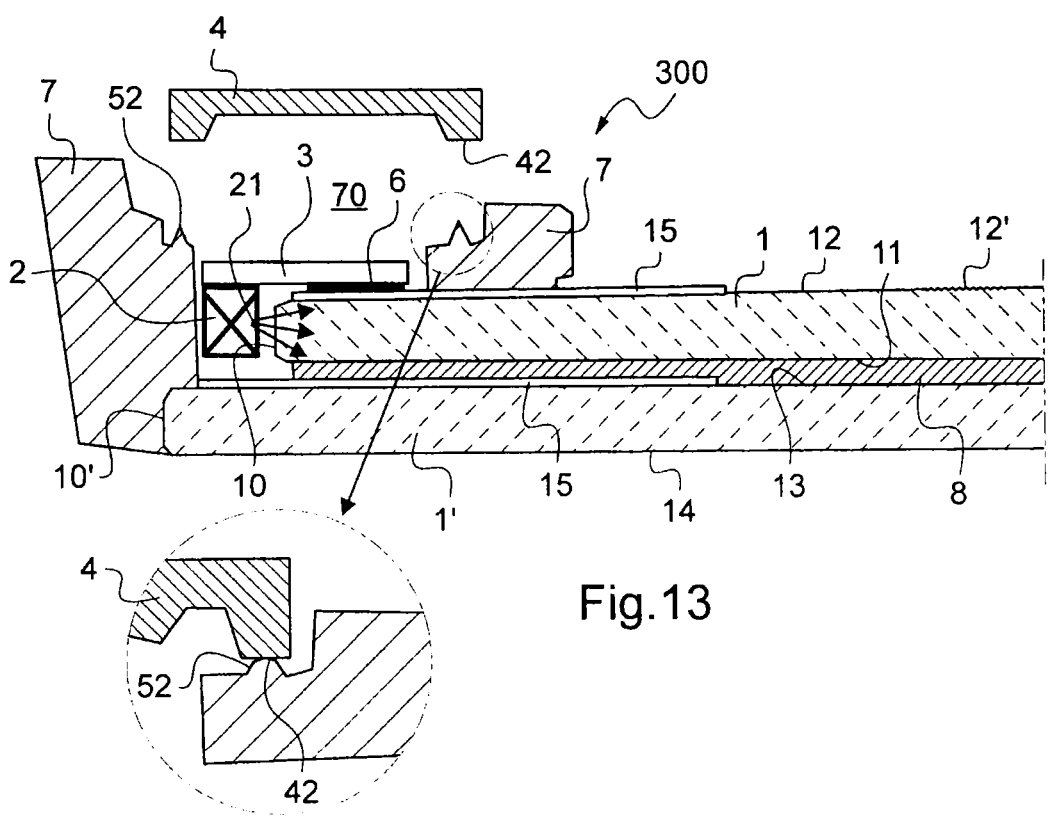

FIG. 13 shows a partial schematic cross section of a luminous vehicle glazing 300 in a third embodiment of the invention with a cap to be fastened or a fixed cap (see detail view).

The luminous vehicle glazing 300 differs from the glazing 100 by the type of interfacial sealing element.

In fact, it concerns a sealing section 52 on the functional element 7, close to the cavity housing the diode 70, for example in a trench, the functional element then being preferably selected from TPE or elastomer rubber.

The section is obtained by machining the mold (allowing simpler design of the cap or broadly speaking, of the tooling used to manufacture the functional element).

During the installation of the cap 4, the closure force (screwing, clipping, or even bonding, etc.) causes compression of the sealing section (see detail view).

FIG. 14 shows a partial schematic cross section of a luminous vehicle glazing 400 in a fourth embodiment of the invention. FIG. 14 bis shows a partial schematic plan view of the connecting part 7' used in the fourth embodiment in FIG. 14. FIGS. 14 ter and 14 quater respectively show a partial schematic plan view of the cap 4 and a cross section of the cap 4 in the embodiment in FIG. 14.

Only the differences from the glazing 100 are shown.

The cap 4, fixed indirectly to the functional element 7, is fixed to a connecting part 7' in the form of a frame placed on the first sheet and on the outer face of the overmolding 7, for example oval and accommodated (mainly) in the cavity 70 and framed with a part in the overmolding (openings 73' being filled by the overmolding).

The interfacial seal 5 is arranged between the inner face of the cap and the free outer face of the connecting part 7' made from PP, PA66, PBT.

The reversible cap fastening means are clipping means, for example local and arranged on the inner face of the cap, for example four clipping pins 83 forming an integral part of the cap (cf FIG. 14 quater). The inner face of the cap therefore has pin-free zones 43.

The clipping means 83 are clipped to the interior of the connecting part 7', (cf. FIG. 14 bis) or alternatively to the exterior.

Alternatively, the connecting part is bonded to the first sheet (and/or to the overmolding).

FIG. 15 shows a partial schematic cross section of a luminous vehicle glazing 110 in an alternative of the first embodiment of the invention shown in FIG. 1.

The glazing 110 differs from the glazing 100 by the absence of a marginal cavity of the first sheet (sheets 1 and 1' being edge to edge), optionally implying a larger lateral encapsulation width.

The cavity 70 here is blind in the thickness (bottom shaped by the encapsulation and not by the face 13 of the second sheet 1').

FIG. 16 shows a partial schematic cross section of a luminous vehicle glazing 120 in an alternative of the first embodiment of the invention shown in FIG. 1.

The glazing 120 differs from the glazing 100 by the type of diodes 2', the position and fastening of the support section 3.

In fact, the diodes 2' here have a main emission normal to the section (normal emitting face 21).

The section 3 is parallel to the injection edge 10 and fixed in a housing 40' provided at the inner face of the cap.

The glazing 110 differs also from the glazing 100 by the absence of a marginal cavity of the first sheet (sheets 1 and 1' edge to edge), optionally implying a larger lateral encapsulation width.

FIG. 16bis shows a partial schematic cross section of a luminous vehicle glazing 130 in an alternative of the first embodiment of the invention shown in FIG. 1.

The glazing 130 differs from the glazing 100 by the use of an optical fiber 20 with a side emitting face 21' fiber installed (wedged), for example by a support section 3" to the face 13. The primary light source may be a diode (not shown) also in the cavity 70.

The optical fiber from 3M called 3M™ Precision Lighting Elements is used for example.

FIG. 17 shows a partial schematic cross section of a luminous vehicle glazing 500 in a fifth embodiment of the invention.

In the glazing 500 the cap and the interfacial sealing element of the glazing 100 are replaced by a mastic 4' comprising a pull-off device with a thread 8'.

FIG. 17bis shows a partial schematic cross section of the luminous vehicle glazing 600 in a sixth embodiment of the invention.

The glazing 600 differs from the glazing 100' in FIG. 11 bis by the fact that the overmolding is single-face, comprises duplicate molded fastening supports X of a vehicle element (windshield, etc.) on the glazing preferably extends along two sides of the glazing (without forming a frame) as shown in FIG. 17ter.

The bonding 91 to the body is peripheral on the overmolding and closer to the edge than the cavity 70.

The glazing 600 is for example an automobile roof.

As an alternative overmolding, use is made of a metal part (frame, etc.) bonded to the second face 12, with the cavity or cavities 70 and the fastening supports.

Alternatively, the duplicate molded fastening supports serve to fix the glazing to a vehicle element (body, etc.), so that the glue 91 is eliminated.

FIG. 18 shows a partial schematic cross section of a luminous vehicle glazing 700 in a seventh embodiment of the invention.

The glazing 600 differs from the glazing 100 by the absence of a marginal cavity of the first sheet (sheets 1 and 1' being edge to edge), optionally implying a larger lateral encapsulation width.

The cavity 70 here is blind in the thickness (bottom shaped by the encapsulation and not by the face 13 of the second sheet 1').

Furthermore, the glazing is no longer laminated but is a double glazing with a gasket 17 and a peripheral spacer (replacing the interlayer 8), forming an insulating or vacuum glazing (with other optional spacers).

The masking element 15 (black enamel, for example) of the assembly to the body is on the second face 12 and/or face 11.

This double glazing is particularly suitable for buses or trains.

One of the glasses may further be laminated with an additional glass.

FIG. 19 shows a partial schematic cross section of a luminous vehicle glazing 710 in an alternative of the seventh embodiment of the invention.

The glazing 710 differs from the preceding double glazing 700
first by the addition of an additional glazing 18 to form a triple glazing, the first sheet 1 being for example the central sheet,
by the lateral positions (with regard to the injection edge 10, parallel to the edge 10) of the cavity 70, of the diode array or arrays 2, 3 and of the cap 4.

This triple glazing is suitable for trains in particular.

FIG. 19bis shows a partial schematic cross section of a luminous vehicle glazing 720 in another alternative of the seventh embodiment of the invention.

The glazing 720 differs from the preceding glazing 710 in that the first sheet is an outer sheet and preferably to avoid an extra encapsulation thickness. The cap is angular with a facial type extension substantially parallel to the second face and the gasket 5 is accordingly offset.

FIG. 20 shows a partial schematic cross section of a luminous vehicle glazing 800 in an eighth embodiment of the invention.

The glazing 800 differs from the glazing 100' in FIG. 11bis by the fact that the functional element is single-face, extends along one side of the glazing (without forming a frame) as shown in FIG. 20bis.

The functional element 7 is a polymer seal, for example extruded (of EPDM, etc.) with the cavity or cavities and bonded to the second face 12 by glue 91' for example a two-sided adhesive (acrylic, etc.).

FIG. 21 shows a partial schematic cross section of a luminous vehicle glazing 900 in a ninth embodiment of the invention.

The glazing 900 differs from the glazing 100' in FIG. 11bis by the fact that the functional element is single-face, for example with two cavities and capping on two opposite sides as shown in FIG. 21bis.

The functional element 7 is a metal, plastic (of EPDM, etc.) frame bonded to the second face by glue 91', for example monocomponent PU mastic.

FIG. 21ter shows a schematic elevation view of a vehicle which can integrate the glazing 900 of the ninth embodiment of the invention.

Thus two mobile supports 94 are used, on which the frame is assembled, a shutter 95, an assembly fixed to the vehicle body 90, the mobile supports sliding on the assembly.

FIG. 22 shows a partial schematic cross section of a luminous vehicle glazing 1010 in a tenth embodiment of the invention.

The glazing 1010 differs from the glazing 100 in that
it is monolithic,
it is fastened to the body 90 by glue 91 on the first face 11,
the second face 12 is the outer face of the vehicle,
the encapsulation is three-face with the masking element 15 (opaque enamel for example) on the face 11.

This is, for example, a side window particularly an automobile window, as shown in FIG. 23.

The cap here is visible and also serves as an appearance item, trim, with a curved shape for example, and the overmolding has grooves 84 for positioning the cap.

FIG. 22bis shows a partial schematic cross section of a luminous vehicle glazing 1020 in an alternative of the tenth embodiment of the invention.

The glazing 1010 differs from the preceding glazing 1020 in that the overmolding has grooves for accommodating the interfacial seal 5.

FIG. 22ter shows a partial schematic cross section of a luminous vehicle glazing 1030 in another variant of the tenth embodiment of the invention.

The glazing 1010 differs from the preceding glazing 1020 in that the interfacial seal 5 is replaced by reversible glue 5'.

FIG. 24 shows a partial schematic cross section of a luminous vehicle glazing 2000 in an eleventh embodiment of the invention.

The glazing 1010 differs from the glazing 100 in that
it is monolithic,
the encapsulation is three-face with the masking element 15 (opaque enamel, for example) on the face 11.

This is, for example, a vehicle rear window
with a luminous zone 12' on the outer face 11, hence view from the exterior (vehicle locating means, stop lights, etc.),
with a luminous zone 12" on the inner face 12, hence for the interior.

FIG. 26 shows a partial schematic cross section of a luminous vehicle glazing 3000 in a twelfth embodiment of the invention.

The glazing 3000 differs from the glazing 100 in that
it is monolithic, preferably made of plastic, polycarbonate,
the injection edge is replaced by an injection side, hence with the cavity 70, the diode 2 array 3, the cap 4 (essentially or even entirely) above the second face 12,
the overmolding is three-face.

Furthermore, the second face 12 comprises a marginal hole 70' (limited in its length as shown in FIG. 27) prolonging the cavity 70.

More precisely, the sheet is a bimaterial sheet, that is to say, transparent and with a black peripheral zone 1" serving to mask the fastening (here associated with face 12 for example).

The fastening means may be connected to the PC.

It is feasible to duplicate mold threaded elements in the PC or to thread the PC later (to allow direct screwing of the cap in the PC).

FIG. 28 shows a partial schematic cross section of a luminous vehicle glazing 4000 in a thirteenth embodiment of the invention.

The glazing 3000 differs from the glazing 100 in that
it is monolithic,
the overmolding is replaced by a holder, for example of PA66, PBT, a window lift, because this is a side window as shown in FIG. 28bis.

The part 7 is recessed and bonded to the window by (permanent) glue 91'. The fastening means are for example side hooks 85 attached to slots in the part 7.

The support section 3 and the diodes 2' are as shown in FIG. 19bis.

FIG. 29 shows a partial schematic cross section of a luminous vehicle glazing 5000 in an alternative of the thirteenth embodiment of the invention.

The glazing 5000 differs from the glazing 4000 by the positioning of the section and the type of diodes and the fastening of the cap (as for FIG. 1).

FIG. 30 shows a partial schematic cross section of a luminous vehicle glazing 510 in a fifteenth embodiment of the invention.

The differences from the glazing 100 alone are shown.

The cavity of the overmolding is of the lateral type: groove 70 alone here or alternatively multiple (for a plurality of diode arrays, for example) facing the edge 10 of the first sheet.

The glazing 510 also differs from the glazing 100 by the sealing means. In fact, the caps and interfacial sealing elements are replaced by an (essentially) lateral mastic 4' preferably comprising a pull-off device by a thread plugging the groove 70.

Finally, the section is fixed to the inner face 13 of the second sheet (further eliminating the interfering light exiting upward).

FIG. 31 shows a partial schematic cross section of a luminous vehicle glazing 520 in a sixteenth embodiment of the invention.

The differences from the glazing 510 alone are shown.

To facilitate assembly, the diode array is fixed by bonding 6' in an insert, metal for example, having a U cross section 30, force-fit into the groove.

FIG. 32 shows a partial schematic cross section of a luminous vehicle glazing 530 in a seventeenth embodiment of the invention.

Only the differences from the glazing 520 in FIG. 31 are shown.

To facilitate assembly, the diode array is fixed by bonding 6' in an insert, metal for example, having a U cross section 30, force-fit into the groove.

The groove is partial in its length as shown in FIG. 32 bis.

The invention claimed is:

1. A luminous vehicle glazing, comprising:
   a first sheet comprising a mineral or an organic glass comprising a first main face, a second main face, and an injection edge;
   a peripheral light source comprising an emitting face selected from the group consisting of an optical fiber and light emitting diodes each comprising a semiconductor chip on a support section of the diodes, wherein the emitting face faces the injection edge or a side of the second main face, which is an injection side for propagation of an injected visible and/or ultraviolet (UV) light in a thickness of the first sheet, the first sheet then guiding the injected light;
   a luminous zone formed by a surface diffusion extractor of the first and/or second main face, which extracts the guided light via the first and/or the second main face or a volume diffusion extractor in the first sheet, and/or a luminophore on the first and/or second main face, which converts UV light to visible light via the first and/or the second main face;
   an peripheral functional element, bonded to the first sheet, which is fluid-tight and impermeable to liquid water or water vapor, extending on the injection edge or the injection side, wherein the peripheral functional element is an overmolding or a preassembled element, and wherein the peripheral functional element comprises a cavity for placing the peripheral light source, which allows the injection of the injected light into the injection side or the injection edge;
   a fluid-tight covering element, which covers the cavity and the peripheral light source, wherein the covering element is impermeable to liquid water or water vapor, and is selected from the group consisting of:
   i) a cap joined by a fastening element to the peripheral functional element, and/or to a connecting part placed at least partly in the cavity and connected to the peripheral functional element and/or connected to the first sheet, and/or to the first sheet, wherein the cap comprises an inner face, which oriented toward the cavity, the cap being combined with an interfacial sealing element which is impermeable to liquid water or water vapor, and which is arranged a) between the cap and the peripheral functional element and/or an underlying connecting part and/or the second face, and/or b) integrated with the cap and in contact with the peripheral functional element, and/or c) integrated with the peripheral functional element and in contact with the cap; and
   ii) a fluid-tight sealing mastic covering the peripheral light source and sealing the peripheral functional element.

2. The luminous vehicle glazing of claim 1, wherein the peripheral functional element is duplicate molded and polymeric, and
   wherein the glazing comprises, between the encapsulation and the glazing, a layer comprising a mono-, bi- or tri-component primer comprising a polyurethane, polyester, polyvinyl acetate, or isocyanate.

3. The luminous vehicle glazing of claim 1, wherein the peripheral functional element is a one-sided part on the second main face selected from the group consisting of an overmolding or a bonded part, a part comprising a fastening support (X) of a vehicle element on the glazing or of the glazing on a vehicle element, along the injection side or at least two opposite sides of the glazing.

4. The luminous vehicle glazing of claim 1, wherein the interfacial sealing element is a reversible glue forming part of or constituting a reversible fastening element, which fastens the cap and the peripheral functional element or the connecting part or the second face.

5. The luminous vehicle glazing of claim 1, wherein the interfacial sealing element is a compressed material, the compressive sealing of the material being achieved by a closure force of the cap interfacial sealing element, which is selected from the group consisting of:
   a polymer seal comprising TPE or EPDM with lip seal(s), wherein the seal is in a groove of the cap, or a groove in the peripheral functional element or of the connecting part or of the second face;
   a polymer seal section on the peripheral functional element, comprising EPDM, which is on the inner face or on a side of the polymer cap, or a seal section on the connecting part; and
   a foam, optionally adhesive, selected from the group consisting of an acrylic foam, PU, a rubber, a thermoplastic elastomer, TPE, polyester.

6. The luminous vehicle glazing of claim 1, wherein the fastening element is reversible, and is selected from the group consisting of:
   clipping element arranged on the cap, and accommodated for clipping in a host zone of the peripheral functional element and/or of the connecting part and/or of the first sheet;
   a second clipping element forming an integral part of the cap and accommodated in host zone of the peripheral functional element and/or of the connecting part and/or of the first sheet; and
   a screw element, extending beyond the inner face, between the interfacial sealing element and the side of the cavity.

7. The luminous vehicle glazing of claim 1, wherein the connecting part forms a one-sided recessed part having a closed contour.

8. The luminous vehicle glazing of claim 1, wherein the glazing comprises a masking element, which masks the peripheral light source and any interfering light, and/or which masks a fastener of the glazing to a vehicle body by the second main face, wherein the masking element is:
   a polymer encapsulation part of the peripheral functional element; and/or
   an opaque enamel, on the periphery of the second main face and/or on the first main face or a face of an added sheet film facing the first face when the functional element is one-sided or two-sided; and/or
   a reflecting surface on the periphery of the second main face and/or on the first main face or an added face facing the first face; and/or
   the first sheet is organic, bimaterial, transparent and opaque, an opaque zone of the first sheet on the periphery of the second main face and/or on the first main face, forms a masking of the source and optionally interfering light, and/or forms a masking of the fastener of the glazing to the vehicle body by the second main face.

9. The luminous vehicle glazing of claim 1, wherein the cap is a trim, or the covering element is masked after fastening the glazing to a vehicle body along an edge or forming a frame.

10. The luminous vehicle glazing of claim 1, wherein the cap comprises a securing element for securing the support section and/or a cavity, which accommodates the passage of connections along a housing in the peripheral functional element and/or a positioning element, which positions the support section of the diodes.

11. The luminous vehicle glazing of claim 1, wherein the glazing is a single glazing, the first sheet comprising mineral or organic glass.

12. The luminous vehicle glazing of claim 1, further comprising:
a second sheet comprising a mineral or an organic glass, which is laminated by a lamination interlayer to the first sheet,
wherein the edge of the first sheet comprises a marginal through cavity where the peripheral light source is housed, or the second sheet extends beyond the injection side of the first sheet, creating a side setback of the glazing, and
wherein the marginal cavity or the side setback accommodates a bottom portion of the cavity of the peripheral functional element.

13. The luminous vehicle glazing of claim 1, wherein the glazing is a laminated glazing, a vacuum or insulating double glazing, or a triple glazing comprising a lateral cavity, wherein the cap or mastic is lateral, the first sheet being an outer or central sheet of the triple glazing.

14. The luminous vehicle glazing of claim 1, wherein in the luminous zone is formed an internal ambience lighting, an internal reading lighting by a side window, a roof, a light display of internal and/or external indications.

15. The luminous vehicle glazing of claim 1, the glazing being selected from:
a side window of an automobile, a utility vehicle, a truck, or a train, wherein the peripheral functional element is a securing part of a window raising system or with the trim cap,
a sliding or fixed roof of an automobile, a utility vehicle, a truck, or a train, with a first optionally cambered sheet,
a windshield of an automobile, a utility vehicle, a truck, or a train, with the luminous zone in an enamel frame or nearby, or a rear window in the enamel frame or nearby,
a window or a windshield of an aerial vehicle,
a glazing of a window or a roof of an aquatic vehicle, ship, or submarine,
a double or triple glazing in a train or a bus.

16. A vehicle comprising the luminous vehicle glazing of claim 1.

17. A method for manufacturing the luminous vehicle glazing of claim 1, the method comprising:
placing the first sheet in a mold;
forming the peripheral functional element by overmolding by injecting polymer encapsulation material, and a filling material, a disposable insert, and a mobile mold portion to form the cavity;
assembling the peripheral light source facing the injection side or the injection edge, in or under the cavity; and
covering of the cavity with the covering element and the fastening element.

18. A method for manufacturing the luminous vehicle glazing of claim 1, the method comprising:
supplying the first transparent sheet;
assembling an added functional element with the cavity, wherein the added functional element is a polymer seal or a metal part, and optionally assembling the connecting part;
assembling a support section of the diodes on the first sheet and through the cavity; and
covering of the cavity with the covering element and the fastening element.

19. The luminous vehicle glazing of claim 1, wherein the first sheet comprises a glass comprising a blind hole in its thickness, of the second face, which accommodates the source facing the injection side.

20. The luminous vehicle glazing of claim 19, wherein the hole is present on the entire perimeter of the second main face and the cap forms a frame integrating the fastening element.

21. The luminous vehicle glazing of claim 1, wherein:
the covering element facing the injection side is essentially facial, such that above and/or on the second face or offset from the second face, the covering element faces a coupling space, which is at least a space of radiation emitted before injection; or
the covering element is lateral facing the injection edge, and faces the edge of a second sheet and/or an edge of an optional third sheet of the glazing, which forms a multiple glazing comprising a gas space.

22. The luminous vehicle glazing of claim 21, wherein coupling space is gaseous and/or the local fluid-tight interfacial sealing element is on the periphery of the inner face of the cap or on one side of the cap.

23. The luminous vehicle glazing of claim 21, the fastening of the source to the glazing is carried out outside the coupling space; and, for the diodes, by fastening the support section by bonding to one of the faces of the first sheet or to a face of an associated second sheet and facing the first sheet and extending beyond the injection edge for the fastening or beyond a lamination interlayer or to the inner face of the cap or to the functional element.

* * * * *